US010967289B2

(12) United States Patent
De Wilde

(10) Patent No.: US 10,967,289 B2
(45) Date of Patent: Apr. 6, 2021

(54) COUPLING ELEMENT

(71) Applicant: Jarola Vision B.V., Lutten (NL)

(72) Inventor: Gerrit Jan De Wilde, Anerveen (NL)

(73) Assignee: Jarola Vision B.V., Lutten (NL)

( * ) Notice: Subject to any disclaimer, the term of this patent is extended or adjusted under 35 U.S.C. 154(b) by 9 days.

(21) Appl. No.: 16/095,258

(22) PCT Filed: Apr. 21, 2017

(86) PCT No.: PCT/NL2017/050258
§ 371 (c)(1),
(2) Date: Oct. 19, 2018

(87) PCT Pub. No.: WO2017/183982
PCT Pub. Date: Oct. 26, 2017

(65) Prior Publication Data
US 2019/0134524 A1  May 9, 2019

(30) Foreign Application Priority Data

Apr. 21, 2016 (NL) .................................. 2016651
Jul. 6, 2016 (NL) .................................. 2017118
(Continued)

(51) Int. Cl.
*A63H 33/06* (2006.01)
*A63H 33/10* (2006.01)
(Continued)

(52) U.S. Cl.
CPC ......... *A63H 33/108* (2013.01); *A63H 17/002* (2013.01); *A63H 17/262* (2013.01);
(Continued)

(58) Field of Classification Search
USPC ........ 466/105, 111, 113, 120, 121, 122, 124, 466/128
See application file for complete search history.

(56) References Cited

U.S. PATENT DOCUMENTS 2,885,822 A * 5/1959 Onanian .............. A63H 33/101
446/121
3,220,078 A * 11/1965 Preziosi ................ F16B 21/086
411/349
(Continued)

FOREIGN PATENT DOCUMENTS

CN   101272835 A   9/2008
CN   101438065 A   5/2009
(Continued)

OTHER PUBLICATIONS

International Search Report and Written Opinion for related PCT Application No. PCT/NL2017/050258, dated Sep. 18, 2017, 11 pages.
(Continued)

*Primary Examiner* — Nini F Legesse
(74) *Attorney, Agent, or Firm* — Hovey Williams LLP; Kameron D. Kelly

(57) ABSTRACT

The invention relates to a coupling element comprising a body with an axial axis arrangeable in an opening of an object, which body is provided along its outer periphery with at least one outward extending locking cam, wherein the body is provided with at least one resiliently movable tongue extending therefrom, to which tongue the locking cam is connected, wherein the at least one tongue is movable inward by a force being exerted thereon.

17 Claims, 33 Drawing Sheets

(30) Foreign Application Priority Data

Nov. 16, 2016 (NL) .................................... 2017804
Jan. 31, 2017 (NL) .................................... 2018270

(51) Int. Cl.
*A63H 17/00* (2006.01)
*A63H 17/26* (2006.01)
*F16B 12/26* (2006.01)
*F16B 21/02* (2006.01)
*F16B 7/04* (2006.01)

(52) U.S. Cl.
CPC ......... *A63H 33/101* (2013.01); *A63H 33/106* (2013.01); *F16B 12/26* (2013.01); *F16B 21/02* (2013.01); *F16B 7/042* (2013.01)

(56) References Cited

U.S. PATENT DOCUMENTS

| | | | |
|---|---|---|---|
| 7,736,211 B2 * | 6/2010 | Marzetta | A63H 33/106 446/113 |
| 8,157,470 B2 * | 4/2012 | De Wilde | A63H 33/106 403/348 |
| 9,377,042 B2 * | 6/2016 | De Wilde | A63H 33/101 |
| 9,839,860 B2 * | 12/2017 | Rakhsha | A63H 33/04 |
| 2008/0075528 A1 * | 3/2008 | Marzetta | A63H 33/067 403/238 |
| 2009/0290932 A1 * | 11/2009 | Silbereisen | F16B 19/008 403/314 |
| 2013/0195547 A1 | 8/2013 | De Wilde | |

FOREIGN PATENT DOCUMENTS

| | | |
|---|---|---|
| DE | 8332034 U1 | 2/1984 |
| WO | 2000/057979 A1 | 10/2000 |
| WO | 2007/035081 A1 | 3/2007 |

OTHER PUBLICATIONS

Chinese Office Action dated May 28, 2020 for related Chinese Patent Application No. 201780025283.7, 6 pages.

* cited by examiner

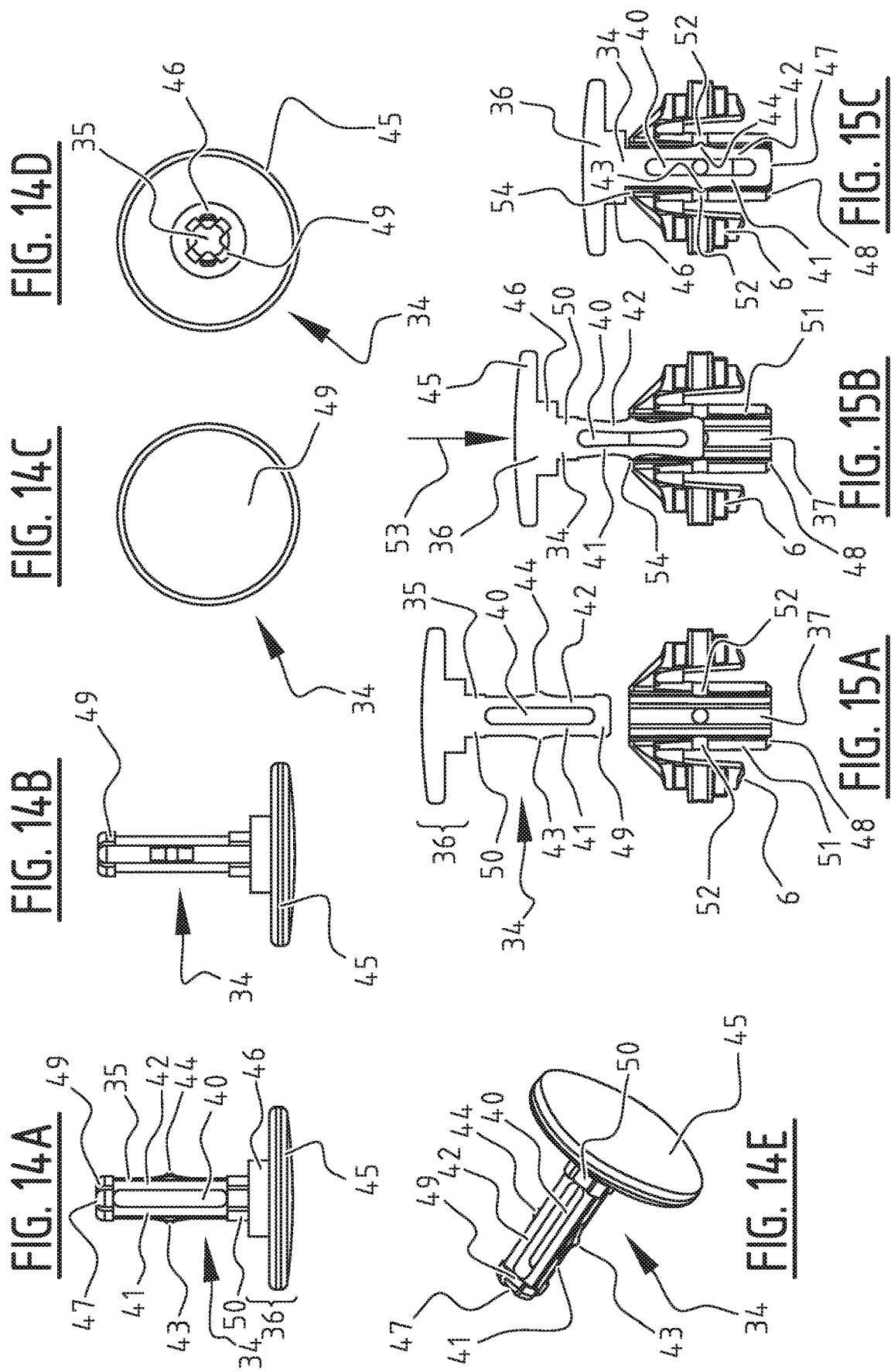

COUPLING ELEMENT

RELATED APPLICATIONS

This application is a national stage application, under 35 U.S.C. § 371 of International Patent Application No. PCT/NL2017/050258, filed on Apr. 21, 2017 and published as WO 2017/183982 on Oct. 26, 2017, which claims priority to The Netherlands Application Nos. 2016651, filed Apr. 21, 2016, U.S. Pat. No. 2,017,118, filed Jul. 6, 2016, U.S. Pat. No. 2,017,804, filed Nov. 16, 2016, and U.S. Pat. No. 2,018,270, filed Jan. 31, 2017, which are hereby incorporated by reference in their entirety.

The invention relates to a coupling element comprising a body with an axial axis arrangeable in an opening of an object, which body is provided along its outer periphery with at least one outward extending locking cam, wherein the body is provided with at least one resiliently movable tongue extending therefrom, to which tongue the locking cam is connected, wherein the at least one tongue is movable inward by a force being exerted thereon.

The coupling element can particularly be intended and configured to form part of a modular construction system as will be described below.

The modular construction system comprises at least one object and a coupling element releasably connectable to the object, wherein:

the object comprises at least one surface with at least one opening, which opening comprises a number of inward extending lips arranged distributed over the periphery of the opening;

the coupling element comprises a body with an axial axis arrangeable in the opening, which body is provided along its outer periphery with at least one outward extending locking cam;

wherein the coupling element is arrangeable in at least one arranging orientation in the opening of the object, in which arranging orientation the at least one locking cam extends between the lips of the object, and wherein the coupling element is rotatable in the opening relative to the object to at least one locking orientation, in which locking orientation the at least one locking cam engages on a lip of the object such that the coupling element is locked in the opening of the object in an axial direction substantially parallel to the axis of the coupling element, wherein the body of the coupling element is provided over its outer periphery with at least one resiliently movable tongue extending therefrom, to which tongue the locking cam is connected, and the opening of the object is provided with a number of inward extending protrusions arranged distributed over the periphery of the opening between the lips such that during a rotation of the coupling element between its arranging orientation and its locking orientation the at least one tongue is moved inward by this protrusion, and in the locking orientation the coupling element is locked in a rotational direction.

Such a construction system is an improvement on the system of WO-A1-2007/035081.

By providing resiliently movable tongues with locking cams connected thereto the function of locking in both axial and rotational direction is integrated in a single element which provides for locking. The coupling element according to the invention is hereby easier to manufacture and the chance of the elements which provide for locking breaking off is reduced compared to the system of WO-A1-2007/035081.

It is noted that, for the purpose of the symmetry and/or the balance and/or the stability of the coupling element, the coupling element preferably comprises more than one, for instance two or four tongues, each with a locking cam, wherein the tongues are arranged distributed over the outer periphery of the body, preferably at equal angular distances.

It is further noted that the locking means, i.e. the at least one resiliently movable tongue with locking cam, provide in the locking orientation of the coupling element a locking against a return rotational or translational movement. In the locking orientation of the coupling element the locking cam thus provides a locking of the coupling element against a translational movement of the coupling element in axial direction out of the object. The resiliently movable tongue locks the coupling element against a rotational movement back to its arranging orientation.

It is further noted that the coupling element can particularly be coupled releasably to the object using the above-mentioned tongue with locking cam. Using some force the locking cam can thus be released and the coupling element can be moved in a return rotational direction to its arranging orientation. In the arranging orientation the coupling element can be moved in axial direction out of the object.

It is further noted that the tongue is resiliently movable inward by a force being exerted thereon, this force being exerted particularly by the protrusion of the object, wherein the tongue moves back resiliently to its normal, not displaced inward, position once the force thereon has been removed. The tongue is therefore movable between a position in which it is not pressed in (not moved inward) and a position in which it is pressed in (moved inward). Inward is also understood to mean in the direction of the body of the coupling element, and outward is understood to mean in a direction away from the body of the coupling element.

It is also noted that the coupling element can be manufactured from any suitable material, for instance plastic.

Depending on the type of structure manufactured with the modular construction system, the coupling element can have any shape and/or size and/or colour. The dimensions of the coupling element can thus be in the order of magnitude of several centimetres for an educational and/or toy system or in the order of magnitude of several (deci)metres for larger-scale structures.

In an embodiment of the coupling element according to the invention the at least one tongue comprises an engaging surface, wherein a protrusion of the object engages on the engaging surface of the tongue during the rotation of the coupling element between its arranging orientation and its locking orientation.

The engaging surface can for instance be formed by a (sub-)front surface of a rib (if present) connected to the tongue, more particularly for instance by a front surface of a projection connected to the tongue and/or rib. A front surface can be understood here to mean that the surface can be arranged on a side of the tongue, rib or projection remote from the body. A (sub-) front surface can be understood here to mean that the engaging surface can be formed by a part of the front surface of the tongue, rib or projection.

In another embodiment of the coupling element according to the invention the at least one tongue is connected to one axial end of the two axial ends of the body, which one axial end is the axial end lying at the greatest distance as seen in axial direction relative to the engaging surface.

An advantage of this embodiment is that the distance between the engaging surface of the tongue and its (pivoting) connection to the body of the coupling element is as long as possible, whereby the forces on the pivoting connection remain relatively low and the chance of the tongue breaking off is relatively small.

In another embodiment of the coupling element according to the invention the coupling element comprises at least one rotation limiting element co-acting with the object.

Such a rotation limiting element can for instance be configured such that it limits the coupling element in its locking orientation against a further rotation in the same direction as that in which the coupling element is rotated from its arranging orientation to this locking orientation.

The rotation limiting element can for instance be a protruding rotation limiting element which is connected to the at least one tongue and extends therefrom and which, in a situation in which it limits the rotation of the coupling element, lies against a part of the object, for instance against a lip thereof, so that further rotation of the coupling element is prevented. The rotation limiting element can particularly extend in a substantially axial direction.

When the coupling element comprises more than one tongue, each tongue can in particular comprise such a rotation limiting element.

The rotation limiting element can for instance comprise a rib or the like.

In another embodiment of the coupling element according to the invention the coupling element comprises at least one engaging element, for instance for engagement by a tool for rotating the coupling element.

The coupling element can be easily rotated relative to the object using a tool which can engage on the engaging element of the coupling element. The coupling element can alternatively be rotated without tool, wherein a user grips particularly with one or more of his/her fingers on the engaging element. As further alternative another object can be used as tool, as will be further elucidated below.

The engaging element can be embodied in any suitable manner.

In an embodiment of the coupling element according to the invention the engaging element can thus be a protruding engaging element extending from the tongue. Such a protruding engaging element can particularly extend outside the outer periphery of the opening on one of the two flat outer sides of the at least one surface of the object and thereby be easily accessible by the tool for the purpose of rotating the coupling element. The engaging element extends here over said flat outer side of the surface of the object. The tool can for instance be used here to press against the protruding engaging element and thus rotate the coupling element. The engaging element can extend particularly in a radially outward direction from the tongue.

Such a (radially outward) extending protruding engaging element can alternatively or additionally serve as insertion limiting element. Because the engaging element protrudes outside the outer periphery of the opening to a position over one of the two flat outer sides of a surface of an object, the engaging element comes to lie against this flat outer side when the coupling element is inserted into the opening of the object. As soon as the engaging element lies against this surface of the object, the coupling element cannot be arranged further into the opening of the object. The coupling element is hereby limited to a maximum insertion depth.

An opening can optionally be arranged in the protruding engaging element for the purpose of receiving an engaging part of the tool so that, after the engaging part thereof has been arranged in the opening of the protruding engaging element, the coupling element can be rotated using the tool.

The opening can if desired serve for connection to a thread. The thread can be guided through the opening and be provided on its end zone guided through the opening with a thickened portion, for instance a (double) knot, so that the thread is received fixedly in the opening and cannot be removed therefrom via the opening.

In yet another embodiment of the coupling element according to the invention the coupling element comprises at least two said tongues which each extend from a different axial end of the two axial ends of the body in an opposite axial direction in order to provide a coupling between two said objects.

By providing the tongues extending in opposite directions the one tongue can serve for coupling to a surface of a first object and the other tongue can serve for coupling to a surface of another object so that the two said objects can be coupled to the coupling element.

For the purpose of balance and/or stability it is preferably the case that a plurality of tongues are connected to the one axial end of the body and that a plurality of tongues are connected to the other axial end of the body, which tongues extend in said opposite directions.

It is noted that the distance between the two axial ends, i.e. substantially the length of the body, can be selected as desired. The distance can thus be selected such that, after a coupling between two objects, the two objects lie substantially against each other. It is alternatively possible to opt for a greater distance or length so that the objects remain at a distance from each other.

In yet another embodiment of the coupling element according to the invention the coupling element is flexibly bendable between its two axial ends.

Using a flexibly bendable coupling element, wherein particularly the body is flexibly bendable, an angle can easily be set between the two axial ends of the body so that the objects are coupled at an angle to each other.

It is noted that, when the body is disposed at an angle, whether this be with the use of a flexibly bendable body or a body permanently bent at an angle, the axial axis and direction is defined along the length of the body, and can thus also be bent at an angle.

In another embodiment of the coupling element according to the invention the engaging element can comprise an opening in the body or in any other part of the coupling element, in which opening an engaging part of the tool can be arranged. The opening can for instance be an optionally continuous opening which extends centrally in an axial direction through the body over a part or the whole length thereof. The opening can particularly extend at both axial ends of the body, wherein the opening can be one continuous opening extending between the two axial ends or wherein the body comprises two openings, one at each axial end of the body.

It is noted that such an optionally continuous opening or openings extending in axial direction through the body can also serve to receive an element other than an engaging part of the tool. It may thus be the case for instance that an object is arranged in the opening so that the opening functions as coupling opening.

It is important that, in the embodiment of the coupling element according to invention wherein an object comprises a skin plate, this skin plate can be coupled for easy release to an object or combination of objects according to the invention.

The invention provides for this purpose a coupling element in which:

the continuous opening of the coupling element is bounded by a sleeve which forms part of the coupling element and which has in each of the areas of the engaging elements an inward oriented longitudinal thickened portion, wherein mutually adjacent longitudinal thickened portions bound respective longitudinal recesses.

In yet another embodiment of the coupling element according to the invention the system comprises movement limiting means for limiting the inward movement of the at least one tongue.

The movement limiting means can comprise a stop, for instance a rib or projection, arranged on the at least one tongue on a side thereof facing toward the body of the coupling element or arranged on the outer periphery of the body of the coupling element in an area which is in register with the tongue.

The invention also relates to a coupling element with at least one insertion limiting element co-acting with the object. The insertion limiting element can for instance be a (radially outward) extending protruding insertion limiting element as described above. Using the at least one insertion limiting element the distance or depth to which the coupling element can be arranged in the opening of the object is limited to a maximum insertion distance or depth.

Described below is a modular construction system of which the coupling element according to the invention can optionally form part. The coupling element according to the invention can have one or more of the features as described below with reference to the modular construction system in any combination, to the extent they apply to the coupling element.

As elucidated above, the modular construction system comprises at least one object and a coupling element releasably connectable to the object, wherein:

the object comprises at least one surface with at least one opening, which opening comprises a number of inward extending lips arranged distributed over the periphery of the opening;

the coupling element comprises a body with an axial axis arrangeable in the opening, which body is provided along its outer periphery with at least one outward extending locking cam;

wherein the coupling element is arrangeable in at least one arranging orientation in the opening of the object, in which arranging orientation the at least one locking cam extends between the lips of the object, and wherein the coupling element is rotatable in the opening relative to the object to at least one locking orientation, in which locking orientation the at least one locking cam engages on a lip of the object such that the coupling element is locked in the opening of the object in an axial direction substantially parallel to the axis of the coupling element, wherein the body of the coupling element is provided over its outer periphery with at least one resiliently movable tongue extending therefrom, to which tongue the locking cam is connected, and the opening of the object is provided with a number of inward extending protrusions arranged distributed over the periphery of the opening between the lips such that during a rotation of the coupling element between its arranging orientation and its locking orientation the at least one tongue is moved inward by this protrusion, and in the locking orientation the coupling element is locked in a rotational direction.

It is noted that the opening of the object comprising lips and/or protrusions can be understood to mean that the object, in particular for instance the surface thereof and more particularly for instance a peripheral edge which defines the opening, comprises the lips and/or protrusions which for instance extend inward from the surface, in particular for instance from said peripheral edge, relative to the opening.

The lips and/or protrusions can be attached to or be part of the surface and can extend from the surface, in particular for instance from the peripheral edge of the opening, into the opening.

It is further noted that the protrusions being arranged between the lips is understood to mean as seen in a peripheral direction of the opening such that the protrusions are arranged between the lips in a direction of rotational movement of the coupling element relative to the object. The protrusions and lips can, but do not have to be, located here in the same plane.

It is also noted that, for the purpose of rotating the coupling element between its arranging orientation and its locking orientation, the coupling element rotates relative to the object. It is therefore also possible to rotate the object relative to the coupling element, although it is simpler in practice to rotate the coupling element.

It is also noted that, for the purpose of the symmetry and/or the balance and/or the stability of the coupling element, the coupling element preferably comprises more than one, for instance two or four tongues, each with a locking cam, wherein the tongues are arranged distributed over the outer periphery of the body, preferably at equal angular distances.

It is further noted that the locking means, i.e. the at least one resiliently movable tongue with locking cam, provide in the locking orientation of the coupling element a locking against a return rotational or translational movement. In the locking orientation of the coupling element the locking cam thus provides a locking of the coupling element against a translational movement of the coupling element in axial direction out of the object. The resiliently movable tongue locks the coupling element against a rotational movement back to its arranging orientation.

It is further noted that the coupling element can particularly be coupled releasably to the object using the above-mentioned tongue with locking cam. Using some force the locking cam can thus be released and the coupling element can be moved in a return rotational direction to its arranging orientation. In the arranging orientation the coupling element can be moved in axial direction out of the object.

It is further noted that the tongue is resiliently movable inward by a force being exerted thereon, this force being exerted particularly by the protrusion of the object, wherein the tongue moves back resiliently to its normal, not displaced inward, position once the force thereon has been removed. The tongue is therefore movable between a position in which it is not pressed in (not moved inward) and a position in which it is pressed in (moved inward). Inward is also understood to mean in the direction of the body of the coupling element, and outward is understood to mean in a direction away from the body of the coupling element.

It is also noted that the at least one object and/or the at least one coupling element can be manufactured from any suitable material, for instance plastic.

Depending on the type of structure manufactured with the modular construction system, the at least one object and/or the at least one coupling element can have any shape and/or size and/or colour. The dimensions of the objects and/or coupling elements can thus be in the order of magnitude of several centimetres for an educational and/or toy system or in the order of magnitude of several (deci)metres for larger-scale structures.

The at least one object can for instance be a construction element.

In an embodiment of the modular construction system according to the invention the at least one tongue comprises an engaging surface, wherein a protrusion of the object engages on the engaging surface of the tongue during the rotation of the coupling element between its arranging orientation and its locking orientation.

The engaging surface can for instance be formed by a (sub-)front surface of a rib (if present) connected to the tongue, more particularly for instance by a front surface of a projection connected to the tongue and/or rib. A front surface can be understood here to mean that the surface can be arranged on a side of the tongue, rib or projection remote from the body. A (sub-) front surface can be understood here to mean that the engaging surface can be formed by a part of the front surface of the tongue, rib or projection.

In another embodiment of the modular construction system according to the invention the at least one tongue is connected to one axial end of the two axial ends of the body, which one axial end is the axial end lying at the greatest distance as seen in axial direction relative to the engaging surface.

An advantage of this embodiment is that the distance between the engaging surface of the tongue and its (pivoting) connection to the body of the coupling element is as long as possible, whereby the forces on the pivoting connection remain relatively low and the chance of the tongue breaking off is relatively small.

In another embodiment of the modular construction system according to the invention the coupling element comprises at least one rotation limiting element co-acting with the object.

Such a rotation limiting element can for instance be configured such that it limits the coupling element in its locking orientation against a further rotation in the same direction as that in which the coupling element is rotated from its arranging orientation to this locking orientation.

The rotation limiting element can for instance be a protruding rotation limiting element which is connected to the at least one tongue and extends therefrom and which, in a situation in which it limits the rotation of the coupling element, lies against a part of the object, for instance against a lip thereof, so that further rotation of the coupling element is prevented. The rotation limiting element can particularly extend in a substantially axial direction.

When the coupling element comprises more than one tongue, each tongue can in particular comprise such a rotation limiting element.

The rotation limiting element can for instance comprise a rib or the like.

In another embodiment of the modular construction system according to the invention the coupling element comprises at least one engaging element, for instance for engagement by a tool for rotating the coupling element.

The coupling element can be easily rotated relative to the object using a tool which can engage on the engaging element of the coupling element. The coupling element can alternatively be rotated without tool, wherein a user grips particularly with one or more of his/her fingers on the engaging element. As further alternative another object can be used as tool, as will be further elucidated below.

The engaging element can be embodied in any suitable manner.

In an embodiment of the modular construction system according to the invention the engaging element can thus be a protruding engaging element extending from the tongue. Such a protruding engaging element can particularly extend outside the outer periphery of the opening on one of the two flat outer sides of the at least one surface of the object and thereby be easily accessible by the tool for the purpose of rotating the coupling element. The engaging element extends here over said flat outer side of the surface of the object. The tool can for instance be used here to press against the protruding engaging element and thus rotate the coupling element. The engaging element can extend particularly in a radially outward direction from the tongue.

Such a (radially outward) extending protruding engaging element can alternatively or additionally serve as insertion limiting element. Because the engaging element protrudes outside the outer periphery of the opening to a position over one of the two flat outer sides of a surface of an object, the engaging element comes to lie against this flat outer side when the coupling element is inserted into the opening of the object. As soon as the engaging element lies against this surface of the object, the coupling element cannot be arranged further into the opening of the object. The coupling element is hereby limited to a maximum insertion depth.

The invention also relates to a coupling element with at least one insertion limiting element co-acting with the object. The insertion limiting element can for instance be a (radially outward) extending protruding insertion limiting element as described above. Using the at least one insertion limiting element the distance or depth to which the coupling element can be arranged in the opening of the object is limited to a maximum insertion distance or depth.

An opening can optionally be arranged in the protruding engaging element for the purpose of receiving an engaging part of the tool so that, after the engaging part thereof has been arranged in the opening of the protruding engaging element, the coupling element can be rotated using the tool.

The opening can if desired serve for connection to a thread. The thread can be guided through the opening and be provided on its end zone guided through the opening with a thickened portion, for instance a (double) knot, so that the thread is received fixedly in the opening and cannot be removed therefrom via the opening.

In another embodiment of the modular construction system according to the invention the engaging element can comprise an opening in the body or in any other part of the coupling element, in which opening an engaging part of the tool can be arranged. The opening can for instance be an optionally continuous opening which extends centrally in an axial direction through the body over a part or the whole length thereof. The opening can particularly extend at both axial ends of the body, wherein the opening can be one continuous opening extending between the two axial ends or wherein the body comprises two openings, one at each axial end of the body.

It is noted that such an optionally continuous opening or openings extending in axial direction through the body can also serve to receive an element other than an engaging part of the tool. It may thus be the case for instance that an object is arranged in the opening so that the opening functions as coupling opening.

In another embodiment of the modular construction system according to the invention the protrusions have an asymmetrical form such that during rotation of the coupling element from the arranging orientation to the locking orientation the inward movement of the tongue requires a force other than that during rotation of the coupling element from the locking orientation to the arranging orientation. Less force can for instance thus be required to rotate the coupling element from the arranging orientation to the locking orientation than vice versa, or less force can for instance be required to rotate the coupling element from the locking orientation to the arranging orientation than vice versa. Particularly when less force is required to rotate the coupling element from the arranging orientation to the locking orientation than vice versa, an object can be used as tool for rotating the coupling element relative to another object.

The asymmetrical form of the protrusions can for instance be formed by a first longer side and a second shorter side of the protrusions, wherein the protrusions can for instance take the form of a non-equilateral triangle.

In yet another embodiment of the modular construction system according to the invention a surface of the object comprises an element protruding from the surface for the purpose of providing an open intermediate space between two objects lying against each other and optionally coupled with a said coupling element, which open intermediate space is configured to allow passage of the engaging element and/or a said tool.

The protruding element creates, or the protruding elements of each object create, a distance between adjacent surfaces of the objects lying against each other, and thereby an open intermediate space between the surfaces. This open intermediate space can serve to accommodate an insertion limiting element and/or engaging element. Through the creation of such an intermediate space the engaging element can optionally be accessible from outside, for instance in that the engaging element extends at least partially in or wholly through the open intermediate space and/or in that the tool can be arranged in the intermediate space to engage on the engaging element.

The created intermediate space can for instance be narrow, and particularly slot-like.

The protruding element(s) can for instance be formed by (a) thickened portion(s) of the surface close to the corner zones or close to the peripheral zone of the object or of each surface.

The protruding element(s) can also be designated here as spacers, since, although the objects can lie against each other, substantially mutually parallel and/or opposite adjacent surfaces of the objects lying against each other can however be held at a distance from each other by the protruding element(s) or spacers.

In yet another embodiment of the modular construction system according to the invention the object comprises at least two surfaces disposed in the same plane adjacently of each other, each with an opening, wherein an open intermediate space is provided between the surfaces.

The intermediate space can for instance be a slot extending between the surfaces.

The intermediate space can have the same shape as the intermediate space created by the above described protruding elements or spacers. There is hereby substantially no visible difference between mutually coupled objects and an object with a plurality of surfaces arranged adjacently of or adjoining each other, which can create an aesthetically pleasing impression.

It can be the case that at least one tongue with locking cam is arranged on an axial end of the body, wherein on one side the coupling element can be coupled to an object using this at least one tongue and wherein on the other side the coupling element can be coupled in any random manner to another object or wherein on the other side the coupling element can be left free and may not be coupled to an object. An above described coupling opening can for instance be used to couple the coupling element on the other side to another object. It can also be the case that the coupling element is permanently connected on the other side to another object, and can be connected releasably via said at least one tongue to the one object so as to provide a releasable coupling between the one object and the other.

In yet another embodiment of the modular construction system according to the invention the coupling element comprises at least two said tongues which each extend from a different axial end of the two axial ends of the body in an opposite axial direction in order to provide a coupling between two said objects.

By providing the tongues extending in opposite directions the one tongue can serve for coupling to a surface of a first object and the other tongue can serve for coupling to a surface of another object so that the two said objects can be coupled to the coupling element.

For the purpose of balance and/or stability it is preferably the case that a plurality of tongues are connected to the one axial end of the body and that a plurality of tongues are connected to the other axial end of the body, which tongues extend in said opposite directions.

It is noted that the distance between the two axial ends, i.e. substantially the length of the body, can be selected as desired. The distance can thus be selected such that, after a coupling between two objects, the two objects lie substantially against each other. It is alternatively possible to opt for a greater distance or length so that the objects remain at a distance from each other.

In yet another embodiment of the coupling element according to the invention the coupling element is flexibly bendable between its two axial ends.

Using a flexibly bendable coupling element, wherein particularly the body is flexibly bendable, an angle can easily be set between the two axial ends of the body so that the objects are coupled at an angle to each other.

It is noted that, when the body is disposed at an angle, whether this be with the use of a flexibly bendable body or a body permanently bent at an angle, the axial axis and direction is defined along the length of the body, and can thus also be bent at an angle.

In yet another embodiment of the modular construction system according to the invention the system comprises a tool for rotating a said coupling element.

The tool can be embodied in any suitable manner.

It can be the case in practical manner that the engaging element of the coupling element comprises an engaging opening for receiving an engaging part of the tool.

The engaging part of the tool is selected here so that it can engage in the engaging opening of the coupling element. The engaging opening and the engaging part of the tool can particularly have a shape adapted to each other.

The shape is preferably non-round so that the engaging part can engage in the engaging opening and so that the coupling element is rotated by rotating the tool.

The engaging opening can particularly be arranged in at least one axial end, preferably in both axial ends, of the coupling element. The engaging opening can more particularly be a central continuous opening which extends through the coupling element along the length thereof.

Using the objects and coupling elements it is particularly possible to construct any desired three-dimensional structure or construction by mutually coupling, and thereby connecting, objects in a chosen shape using the coupling elements. The thus constructed structure can be a substantially open structure, wherein the mutually coupled objects form a framework or frame.

The open structure formed by the objects and coupling elements can if desired be covered and thus given a specific appearance. A said object can for this purpose comprise a skin plate. Using the coupling elements such a skin plate can be arranged on the open structure formed with the modular construction system according to the invention and can thus impart any desired appearance to the structure.

The modular construction system according to the invention can be used for instance for educational or play purposes. Any desired structure can thus be made with the modular construction system, wherein after it has been made the structure can be at least partially taken apart in order to thus make a new, different structure. The construction system can alternatively be used professionally for any desired purpose. A (trade fair) stand frame could thus be made for instance with the modular construction system, wherein the stand can be given a determined appearance using the skin plates. The skin plates could in that case be printed with company information or other desired information.

The skin plates can particularly be plate or sheet-like. They can be flexible as well as stiff. The skin plates can be preformed.

The skin plate can be provided with at least one opening for passage of a coupling element or for passage of a shank of an attaching element as will be further elucidated below. In an embodiment the opening can be embodied as an attaching eyelet as will be further elucidated below. In another embodiment the at least one opening in the skin plate comprises a number of inward extending lips arranged distributed over the periphery of the opening, wherein the opening is also provided with the number of inward extending protrusions arranged distributed over the periphery of the opening between the lips. With such an opening the skin plate can be attached with a coupling element according to the invention to another object according to the invention.

It is noted that the opening comprising lips and/or protrusions can be understood to mean that the skin plate, in particular for instance a peripheral edge defining the opening, comprises the lips and/or protrusions which extend for instance inward from the skin plate relative to the opening.

The lips and/or protrusions can be attached to or be part of the skin plate and extend from the skin plate, in particular for instance from the peripheral edge of the opening, into the opening.

It is further noted that the protrusions arranged between the lips are understood to mean as seen in a peripheral direction of the opening such that the protrusions are arranged between the lips in a direction of rotational movement of the coupling element relative to the skin plate. The protrusions and lips can, but do not have to be, located here in the same plane.

The at least one opening can optionally be arranged in the skin plate with a perforator by the user or earlier during the production process.

The invention also relates to a coupling element intended and configured to form part of a modular construction system according to one or more of the above described embodiments, comprising a body with an axial axis arrangeable in an opening of an object, which body is provided along its outer periphery with at least one outward extending locking cam, wherein the body is provided with at least one resiliently movable tongue extending therefrom, to which tongue the locking cam is connected, wherein the at least one tongue is movable inward by a force being exerted thereon.

As already elucidated above, the tongue is resiliently movable inward by a force being exerted thereon, which force can be exerted particularly by a said protrusion of the object, wherein the tongue moves back resiliently to its normal, not displaced inward, position once the force thereon has been removed. The tongue is therefore movable between a position in which it is not pressed in (not moved inward) and a position in which it is pressed in (moved inward).

The coupling element can have any of the features as further elucidated above or below in any desired combination. The coupling element can particularly, though not exclusively, comprise any of the features of one or more of the claims 1-37 to the extent the features of the claims 1-37 relate to the coupling element or components thereof.

The invention also relates to an object intended and configured to form part of a modular construction system according to one or more of the above described embodiments, comprising at least one surface with at least one opening, which opening comprises a number of inward extending lips arranged distributed over the periphery of the opening, wherein the opening of the object is provided with a number of inward extending protrusions arranged distributed over the periphery of the opening between the lips.

As further elucidated above, the protrusions serve to exert a force on the resiliently movable tongues of the coupling element.

It is noted that when the opening in the surface comprises lips and/or protrusions, this can be understood to mean that the object, in particular for instance the surface thereof, more particularly for instance a peripheral edge defining the opening, comprises the lips and/or protrusions which extend inward relative to the opening.

The lips and/or protrusions can be attached to or be part of the surface and can extend from the surface, in particular for instance from the peripheral edge of the opening, into the opening.

It is further noted that the protrusions arranged between the lips are understood to mean as seen in a peripheral direction of the opening such that the protrusions are arranged between the lips in a direction of rotational movement of the coupling element relative to the object. The protrusions and lips can, but do not have to be, located here in the same plane.

The object can have any of the features as further elucidated above or below in any desired combination. The object can particularly, though not exclusively, comprise any of the features of one or more of the claims 1-37 to the extent the features of the claims 1-37 relate to the object or components thereof.

The invention also relates to a tool intended and configured to form part of a modular construction system according to one or more of the above described embodiments, which tool is configured to rotate a coupling element of the modular construction system.

The tool can have any of the features as further elucidated above or below in any desired combination. The tool can particularly, though not exclusively, comprise any of the features of one or more of the claims 1-37 to the extent the features of the claims 1-37 relate to the tool or components thereof.

It is important that, in the embodiment of the modular construction system according to invention wherein an object comprises a skin plate, this skin plate can be coupled for easy release to an object or combination of objects according to the invention.

The invention provides for this purpose a modular construction system in which:

the continuous opening of the coupling element is bounded by a sleeve which forms part of the coupling element and which has in each of the areas of the engaging elements an inward oriented longitudinal thickened portion, wherein mutually adjacent longitudinal thickened portions bound respective longitudinal recesses;

into which sleeve is inserted the shank, which is resiliently compressible in at least one transverse direction, of a monolithic attaching element with a widened head connecting concentrically to the shank such that the insertion depth of the shank is limited by the head;

wherein the shank has in its central zone two rounded protrusions which are placed mutually diametrically at the same axial positions and which have more or less the form of spherical segments such that the diameter of the shank at this location is greater than the associated inner diameter of the sleeve at the position of the thickened portions, whereby the shank can only be inserted into the sleeve by some axial pressure force being exerted on the head with local resilient radial compression of the shank and lies locked therein against further axial movement in its operative position defined by the head and the associated end edge of the sleeve as a result of resilient engagement of the rounded protrusions in the respective recesses in the centre of the longitudinal recesses and can only be removed therefrom by some axial pulling force being exerted on the head; and the head has adjacently of the shank a relatively narrow part which fits with some free clearance in an attaching eyelet forming part of the skin plate and to which connects a relatively wide part which is present on the side remote from the shank and which prevents passage through the attaching eyelet.

This latter specified embodiment is not limited to the addition of an optionally flexible plate, such as a rigid plate, a fabric, a sheet, a foil or a membrane to a construction according to the invention, but is also suitable for local coupling of for instance a cable, a cord or a rope to the construction by means of an attaching eyelet or attaching loop present on an end of this cable, cord or rope. Such a cable, rope or cord can in some circumstances be used in the manner of a guy rope to reinforce a construction, to limit possible mechanical movements of mechanically loaded components or for lifelike imitation on toy scale of cords, cables and ropes as applied in building constructions.

The construction system in the embodiment of the above specified type can advantageously have the special feature that the shank takes a form, the end view of which at the free end zone corresponds to, but is slightly smaller than, the end view of the inner space of the sleeve such that the shank fits over some distance and with small clearance in this inner space and is locked against rotation relative to the sleeve.

In this embodiment the shank of the attaching element can be inserted easily into the inner space of the sleeve, albeit while exerting the described axial force, and the attaching element is locked against rotation relative to the sleeve, and therefore also relative to the coupling element.

In a practical embodiment the modular construction system of the above described type has the special feature that the shank has an elongate continuous transverse hole over a distance of at least 60% of its effective length, i.e. the distance between the surface of the head oriented toward the shank and the end surface of the shank remote from the head in its operative position;

the two wall parts of the shank bounding the continuous hole each have a thickness of a maximum of 25% of the largest diameter of the shank, and are thereby elastically compressible; and said wall parts hold the rounded protrusions in their central zones.

Because of the more or less free and elastically compressible wall parts a good balance is found in a very natural and simple manner at the design stage of the construction system between on the one hand the fixation force necessary to impart sufficient mechanical strength and stability to a construction built on the basis of the construction system according to the invention and on the other the longitudinal pressure force to be exerted on the head and necessary to insert the shank into the sleeve.

This latter specified embodiment of the construction system according to the invention is preferably embodied such that the effective length of the shank is equal to the length of the sleeve;

the sleeve has a symmetrical construction relative to its median plane, i.e. the plane perpendicularly of the axis of the sleeve and intersecting this axis at its midpoint; and the midpoints of the recesses are located in the median plane.

In this latter variant the shank is dimensioned such that in its operative position its free end surface lies in the plane of the side of the connecting element remote from the head.

In yet another embodiment of the modular construction system according to the invention the system comprises movement limiting means for limiting the inward movement of the at least one tongue.

The movement limiting means can comprise a stop, for instance a rib or projection, arranged on the at least one tongue on a side thereof facing toward the body of the coupling element or arranged on the outer periphery of the body of the coupling element in an area which is in register with the tongue.

In yet another embodiment of the modular construction system according to the invention the tool comprises a pin-like body, which pin-like body extends substantially completely straight or a part of which is bent at an angle.

The angle can be selected as desired and lie for instance between 10 and 90 degrees, more particularly between 45 and 90 degrees. Particularly an angle of about 90 degrees can be highly suitable.

An end zone of the pin-like body can in particular be bent at said angle.

The pin-like body can comprise or form the engaging part.

The pin-like body can extend wholly or partially parallel to a central axis of a handle of the tool, wherein the part thereof optionally bent at the angle extends at said angle relative to the part of the pin-like body parallel to the handle. A first part of the pin-like body is disposed here parallel to the central axis of the handle and a second part, for instance the end zone of the pin-like body, lies at the said angle. In yet another embodiment of the tool, the tool can have a completely straight pin-like body as well as a pin-like body with a part which is bent at a said angle. Such a tool can for instance comprise a middle piece, wherein the two pin-like bodies extend in opposite directions from opposite surfaces of the middle piece. A releasable housing can optionally be provided in which one or both pin-like bodies can be received, for instance for safe storage of one or both pin-like bodies or in order to provide a handle, wherein the pin-like body not being used at that moment is received in the housing, and the housing forms the handle.

The tool can be arranged in an opening of the object opposite to an opening in which a coupling element is arranged. A substantially straight pin-like body is in this case suitable. The tool can alternatively be arranged in an opening of the object which lies at an angle of for instance 90 degrees relative to an opening in which a coupling element is arranged. A pin-like body with a part bent at an angle of for instance 90 degrees is in that case suitable.

In yet another embodiment of the modular construction system according to the invention the system comprises at least two objects, wherein the one object comprises a receiving element in which a pivot shaft of the other object can or can have been received.

An advantage of providing two such objects is that the two objects are pivotable or rotatable relative to each other in that the pivot shaft of the other object can rotate or pivot in the receiving element of the one object. The two objects therefore form a hinge with which two parts of a structure made with the construction system according to the invention can pivot or swivel relative to each other.

The pivot shaft can for instance be cylindrical, wherein the receiving element comprises a hollow cylinder. The objects are then rotatable relative to each other about the rotation axis or central axis of the pivot shaft and the receiving element. The receiving element can optionally be open over a part of the periphery of the jacket of the hollow cylinder in the longitudinal direction of the hollow cylinder so that the pivot shaft of the other object can be arranged in the receiving element and can be removed therefrom. The two objects can in this way have been or be releasably connected. The jacket of the hollow cylinder is alternatively closed over its whole periphery so that the shaft of the other object is connected permanently thereto.

In another embodiment of the pivot shaft is spherical and the receiving element takes the form of a hollow sphere so that the objects together form a ball hinge or ball and socket joint. The hollow sphere can optionally be open over a part of its outer periphery to enable insertion and removal of the spherical pivot shaft, so that the objects are or can be releasably connected. The jacket of the hollow sphere is alternatively closed over its whole periphery so that the pivot shaft of the other object is connected permanently thereto.

In yet another embodiment of the construction system according to the invention the system comprises at least one shaft.

The shaft can for instance be a coupling shaft or connecting shaft, and more particularly a rotation shaft.

Using the shaft an object can for instance be connected or coupled to another (type of) object. Both objects can be objects according to the invention, and in particular according to claim 1, or one object according to the invention, and in particular according to claim 1, can be connected or coupled to another type of object. This other type of object does have an opening or cavity for receiving the shaft, although it may not have the number of inward extending lips.

When the shaft functions as rotation shaft, the two objects can rotate substantially freely relative to each other, in particular through a rotation angle greater than 360 degrees.

Two structures formed with the construction system can for instance rotate substantially freely relative to each other.

One of the two objects can optionally comprise or be a wheel or propeller which can be coupled or connected to an object according to claim 1 using the rotation shaft.

The shaft can have any suitable cross-sectional form. The shaft can for instance be substantially cylindrical with a substantially round cross-sectional form. It may alternatively be a shaft with a polygonal, in particular substantially square, cross-sectional form.

The shaft can optionally be provided with ribs protruding from the peripheral surface of the shaft and extending over the length thereof.

Close to one or both longitudinal end zones the shaft can optionally be provided with a collar or flange which extends in radial direction from the peripheral surface of the shaft.

On one or both longitudinal end zones the shaft can optionally be provided with at least one elongate notch or incision. One or both longitudinal end zones can particularly be provided with two elongate notches or incisions disposed diametrically on opposite sides of the end zone(s). The notch(es) or incision(s) extend in the longitudinal direction of the shaft.

The shaft can optionally be provided with a radially extending collar or flange close to its central zone as seen in the longitudinal direction of the shaft.

In yet another embodiment of the shaft according to the invention the shaft comprises a central part with a thickened cross-section or diameter.

Such a thickened central part provides a strong rotation shaft for relative rotation of the objects coupled to the shaft. The length of the thickened central part can be selected as desired.

In yet another embodiment of the construction system according to the invention the system comprises a substantially plate-like element which takes a smooth form on one main surface and has connecting means on its other main surface for connection to a said object.

When the plate-like element is connected to an object according to the invention, the smooth main surface forms a smooth outer surface of at least a part of the object. This can be advantageous for instance when two objects are connected by a said rotation shaft in that the two objects rotate relative to each other with these smooth outer surfaces facing each other. The smooth surfaces in that case provide a good relative rotation between the two connected objects, particularly with little or no friction between the objects.

The connecting means can for instance comprise snap or click elements which can be pressed into the opening of a said object. The plate-like element can be pulled loose manually from the object to which it is connected.

The connecting means can alternatively comprise a locking cam, wherein the plate-like element is rotatable in the opening of an object between an arranging orientation and a locking orientation, and wherein in the locking orientation the locking cam engages on a lip of the object. In the arranging orientation the plate-like element can be easily arranged in and removed from the opening of the object. In the locking orientation the plate-like element is locked at least in a translational direction against removal of the plate-like element from the opening of the object.

In yet another embodiment of the construction system according to the invention a said object is manufactured from at least two parts, which parts are connected permanently in order to obtain the object.

An object can particularly be manufactured from two identical halves which are permanently connected to each other, for instance by (ultrasonic) welding or adhesion. The two halves can for this purpose comprise mutually co-acting connecting means which are for instance fused together by the welding in order to provide the permanent connection between the two halves. The connecting means can for instance form a dowel-hole or pin-hole connection.

Providing at least two parts which are mutually connected following manufacture gives the advantage that the two parts can be manufactured in simple manner by injection moulding and can in particular be easily released, wherein the actual object is obtained following the mutual connection of the parts.

In yet another embodiment of the construction system according to the invention the object comprises strengthening ribs close to transition zones between two adjacent surfaces in each case.

The strengthening ribs can be formed by elongate thickened portions.

The strengthening ribs can be provided only if an object comprises adjacent surfaces.

The invention also relates to a packaging for a modular construction system, for instance for a modular construction system according to the invention, wherein the packaging comprises connecting means for connecting the packaging to a subsequent packaging.

An advantage of the connecting means is that different packagings can be mutually connected, for instance in a stacked form.

It is noted that the packaging is not limited here to a packaging for the modular construction system according to the invention, but is suitable for packaging any other modular construction system.

In another embodiment of the packaging according to the invention the connecting means are at least partially of substantially the same shape as, in particular identical to, at least a part of an object or a coupling element of the modular construction system to be packed in the packaging.

An advantage hereof is that the packagings can be mutually connected in the same manner as the modular construction system packed or to be packed in the packaging.

In another embodiment of the packaging according to the invention the connecting means comprise at least one surface with at least one opening, which opening comprises a number of inward extending lips arranged distributed over the periphery of the opening.

By arranging a coupling element of the modular construction system according to the invention in its arranging orientation in the opening and then rotating the coupling element to its locking orientation the packagings are locked in their mutually connected position in at least an axial direction of the coupling element.

In another embodiment of the packaging according to the invention the opening is provided with a number of inward extending protrusions arranged distributed over the periphery of the opening between the lips.

Using the protrusions the coupling element can also be locked in rotational direction in its locking orientation, as already described above in this application.

The opening can be disposed in register with a recess in the packaging. The recess can serve to accommodate the coupling element of the modular construction system according to the invention.

The connecting means can have, in any random combination or per se, any feature of an object of the modular construction system according to the invention as described in this application, and in particular in the claims.

The invention also relates to a packaging with a modular construction system therein, for instance for a modular construction system according to any of the foregoing claims, wherein the packaging comprises connecting means for connecting the packaging to a subsequent packaging, wherein the modular construction system comprises at least one of an object and a coupling element, wherein the connecting means are at least partially of substantially the same shape as, in particular identical to, at least a part of an object or a coupling element of the modular construction system to be packed in the packaging.

The packaging can have, in any random combination or per se, any feature of the packaging as described above, such as in the figure description, and in particular as in the claims 29-33.

The invention also relates to a wheel element intended and configured to form part of a modular construction system according to any of the foregoing claim 1-12 or 16-28, comprising:

a receiving space for receiving at least a part of an object of the construction system.

Such a wheel element can be used in a construction system as specified above by means of inserting an object, and optionally a coupling element and/or a shaft, in the receiving space intended therefor.

In an embodiment of the wheel element according to the invention the wheel element is provided with one or more snap fingers configured to engage on an object arranged therein, for instance on at least one lip of the number of lips and/or on at least one protrusion of the number of protrusions thereof.

The invention also relates to a construction system according to any of the claim 1-12 or 16-28, further also comprising a wheel element as according to claim 35.

Such a construction system can be used to build a mobile construction.

The invention will be further elucidated with reference to figures shown in a drawing, wherein.

Figure 1A:
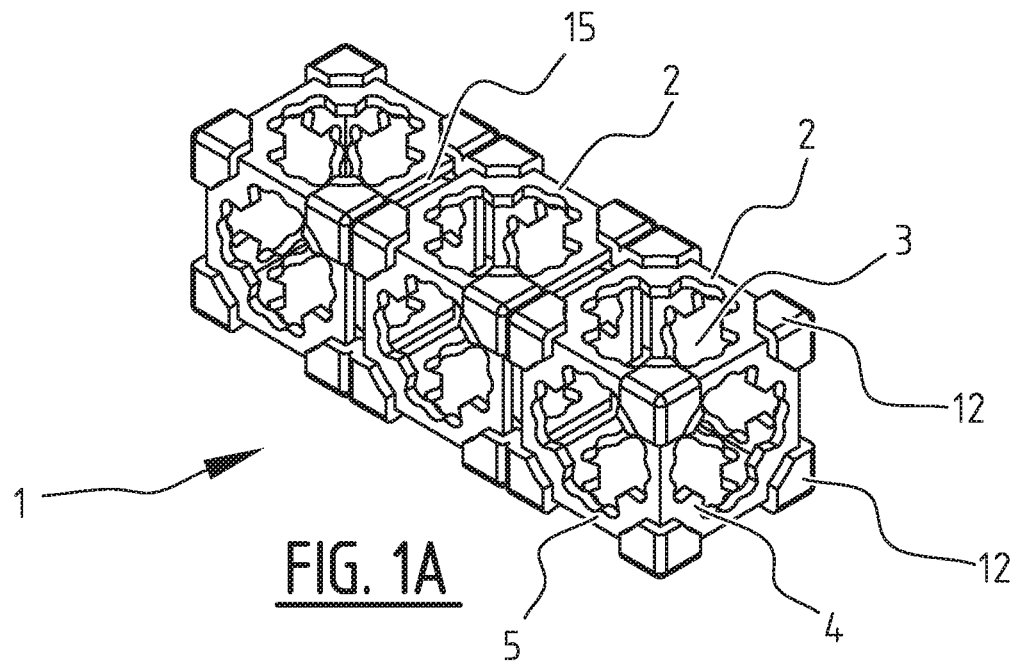
FIGS. 1A and 1B show respectively a perspective view and a front view of an object according to a first embodiment of the invention.
Figure 1B:
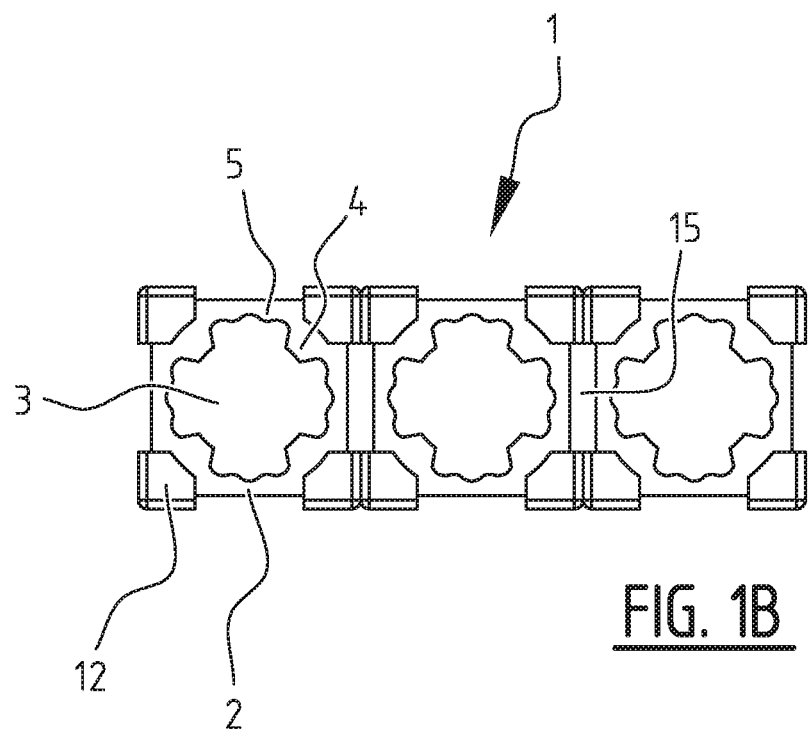
Figure 2A:
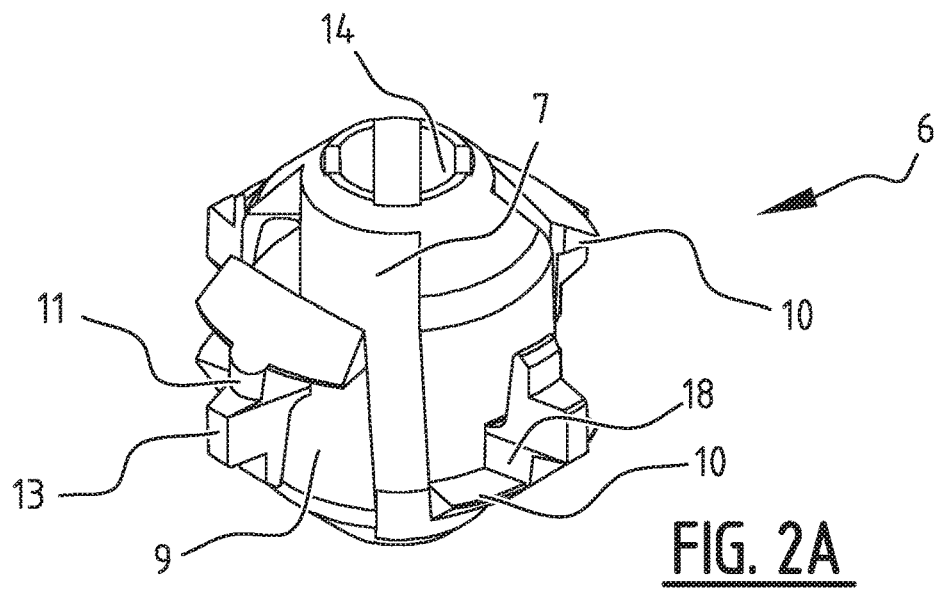
FIGS. 2A-2C show respectively a perspective view and two different side views of a coupling element according to a first embodiment of the invention.
Figure 2B:
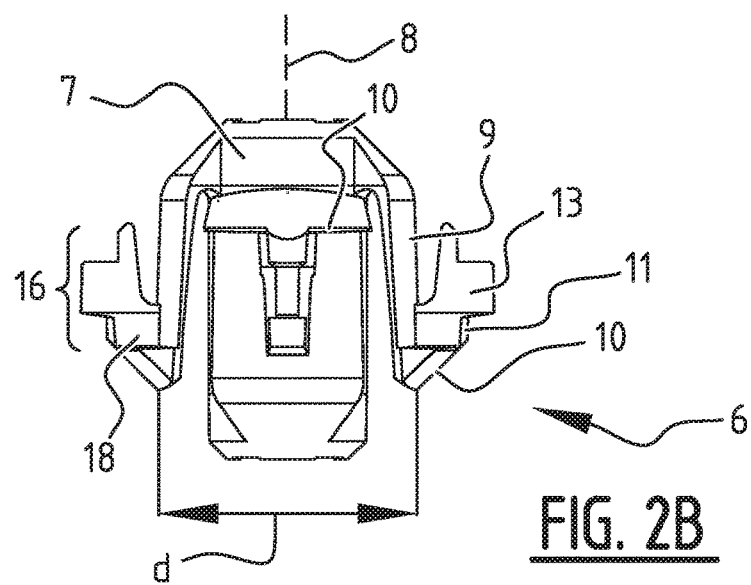
Figure 2C:
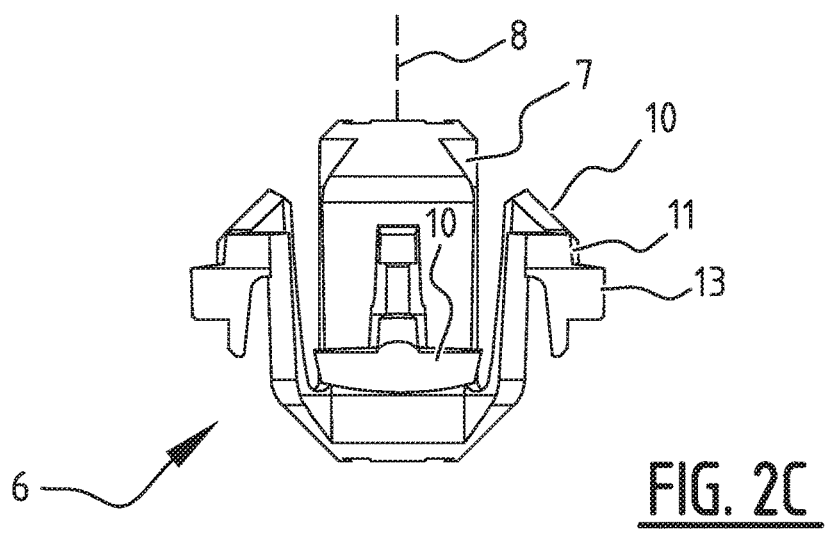
Figure 3A:
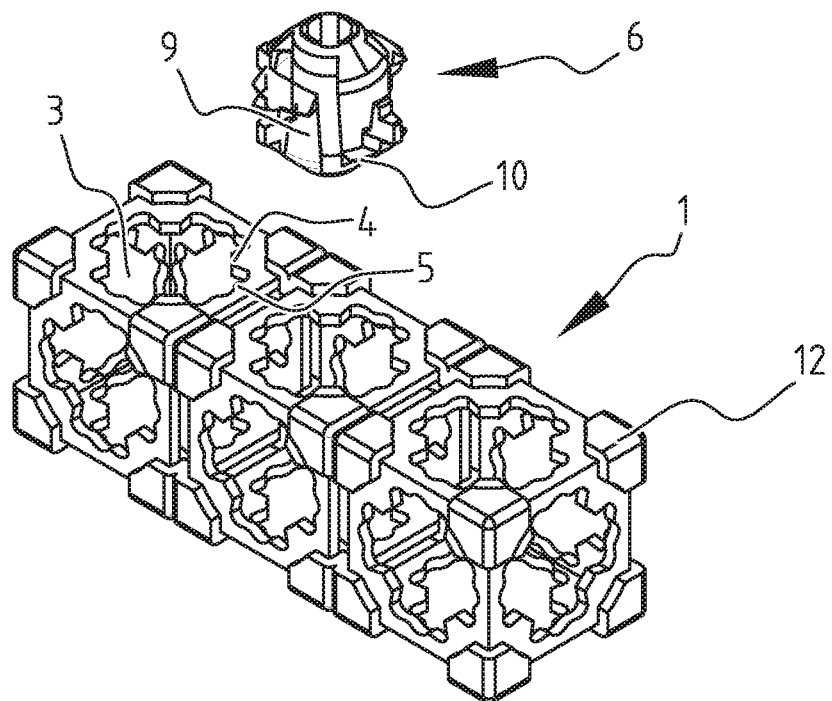
Figure 3B:
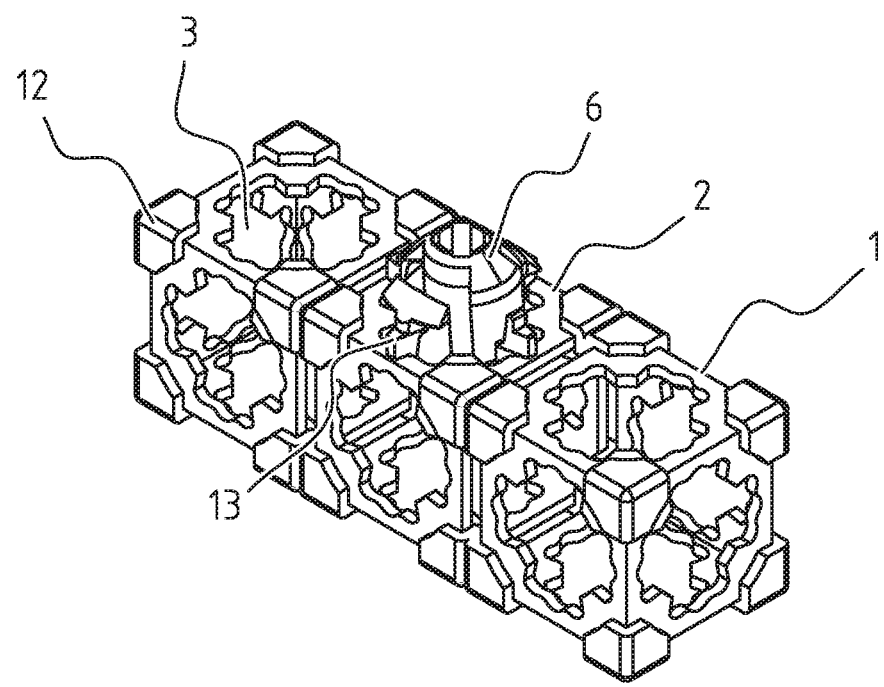
Figure 3C:
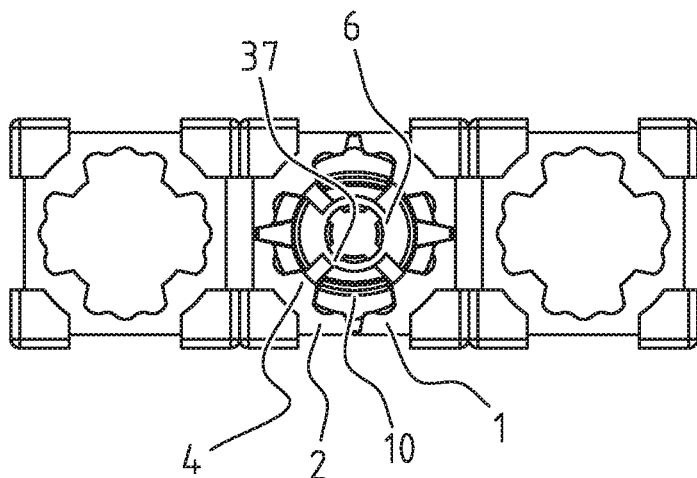
Figure 3D:
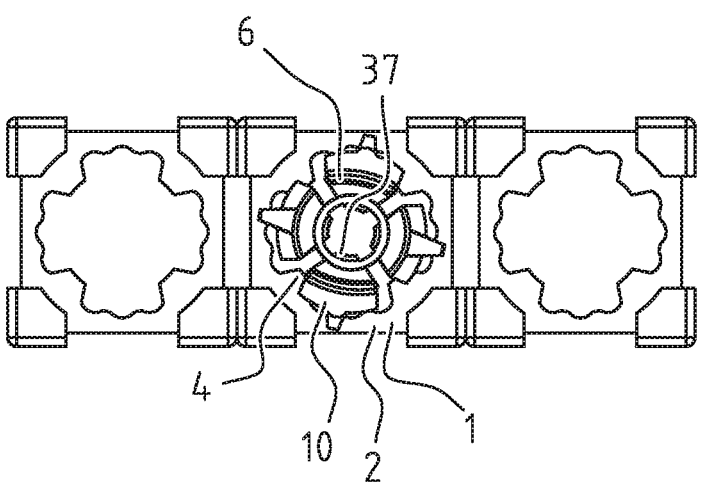
Figure 3E:
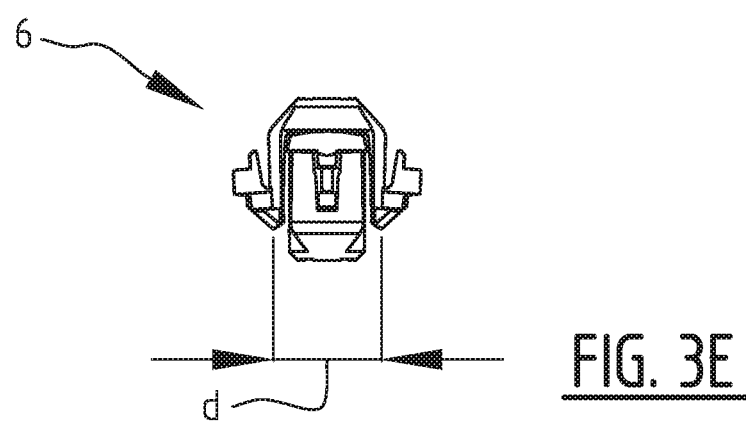
Figure 3F:
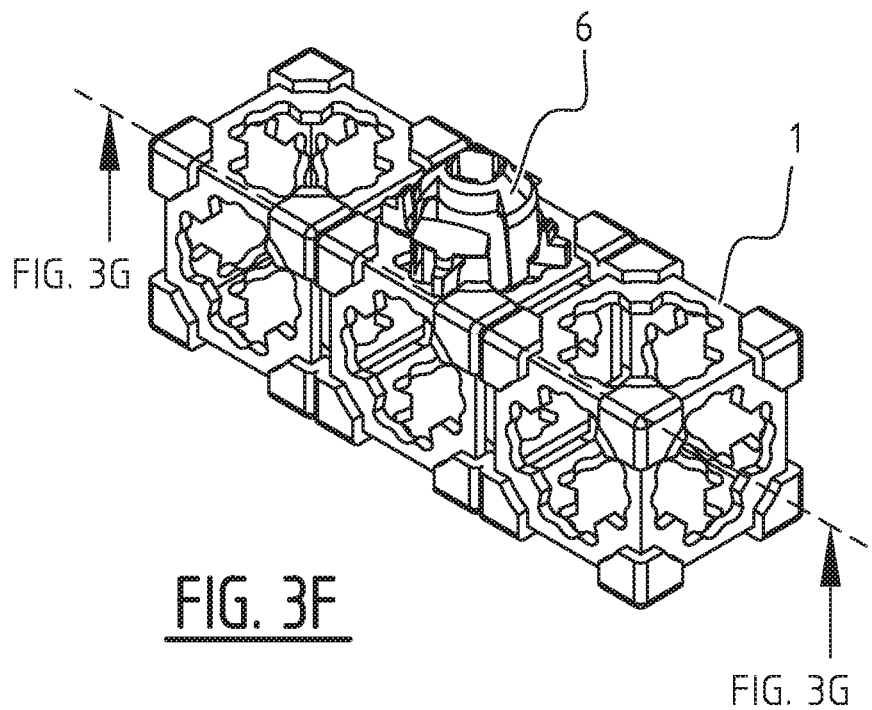
Figure 3G:
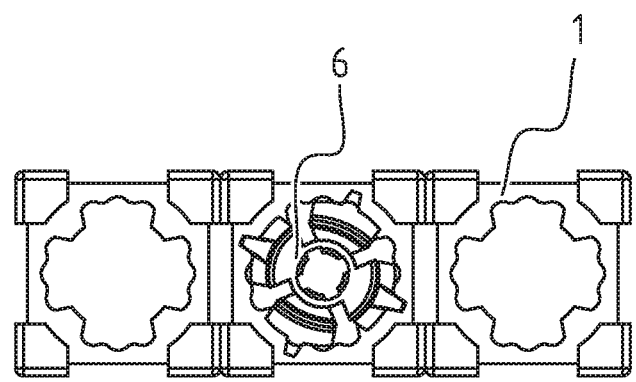
Figure 4:
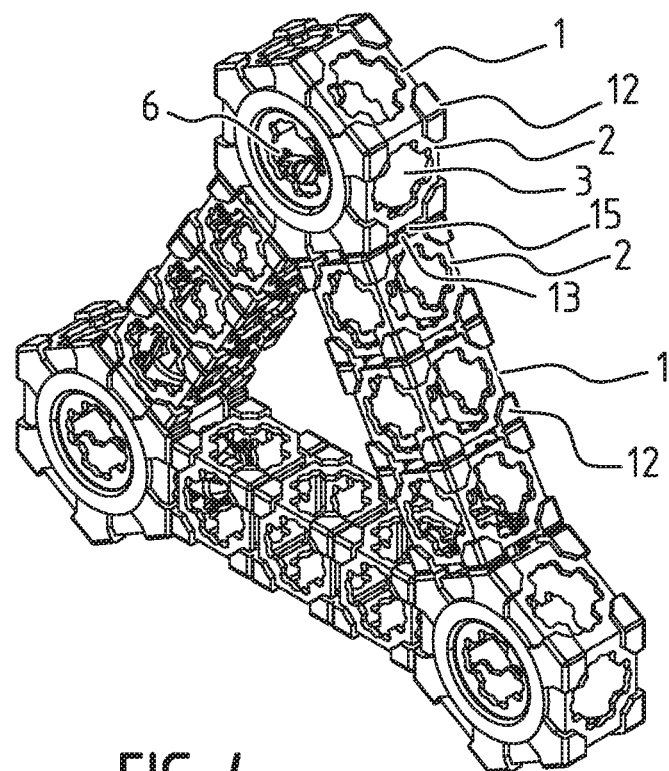
Figure 5:
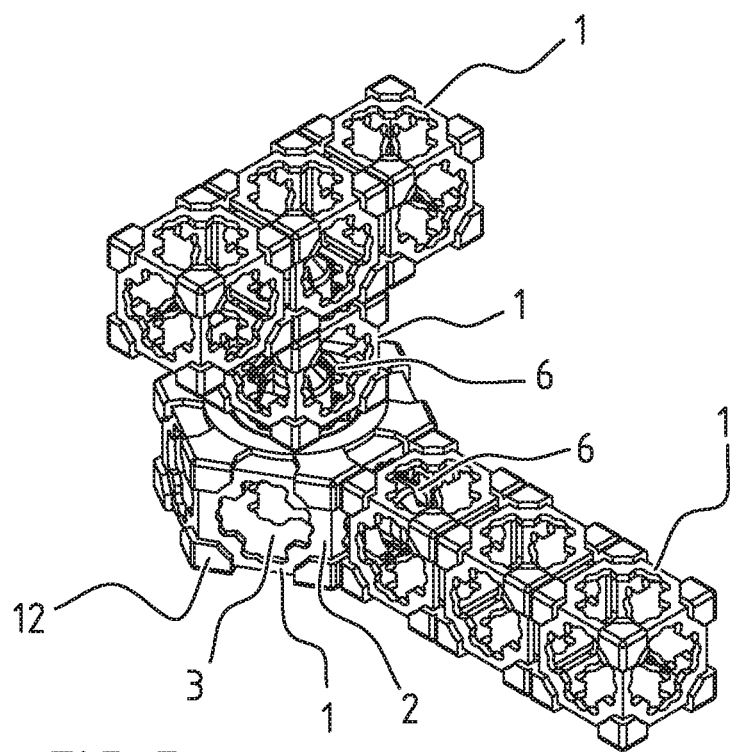
Figure 6:
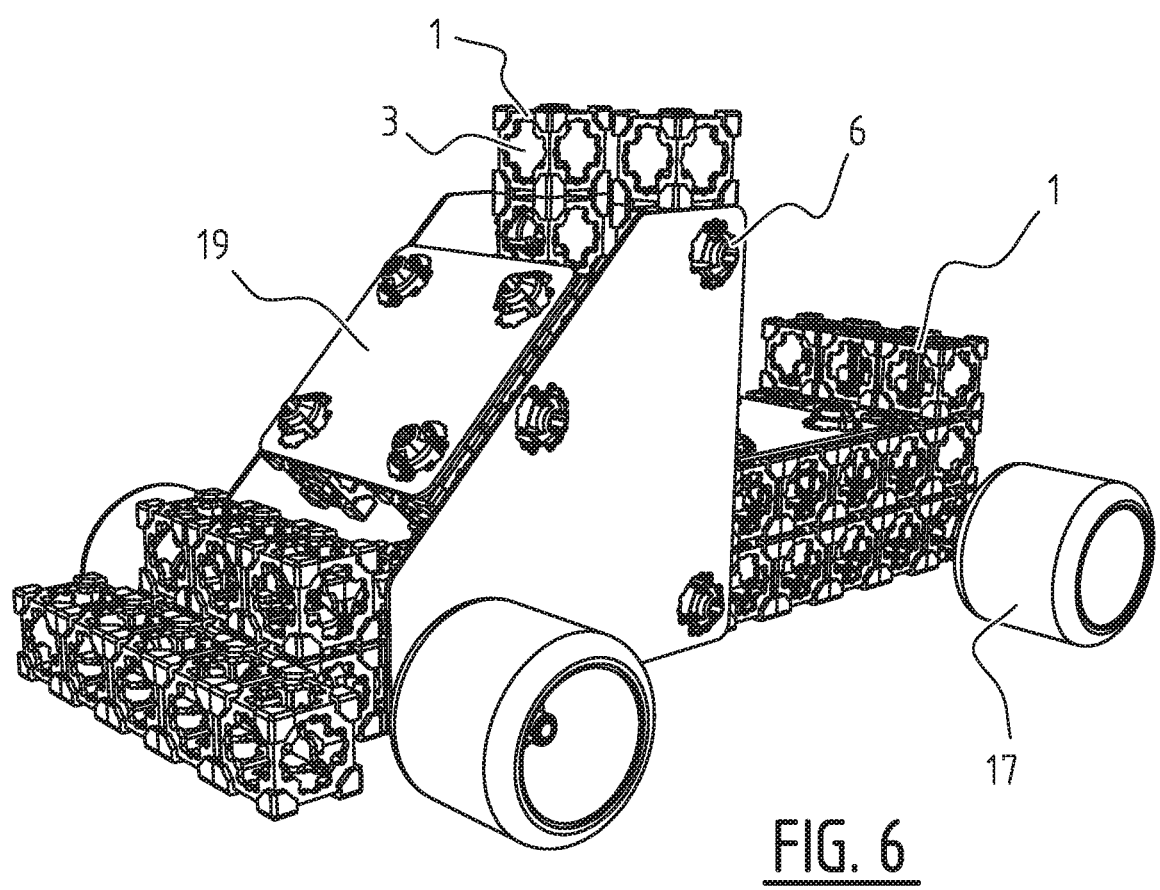
Figure 7C:
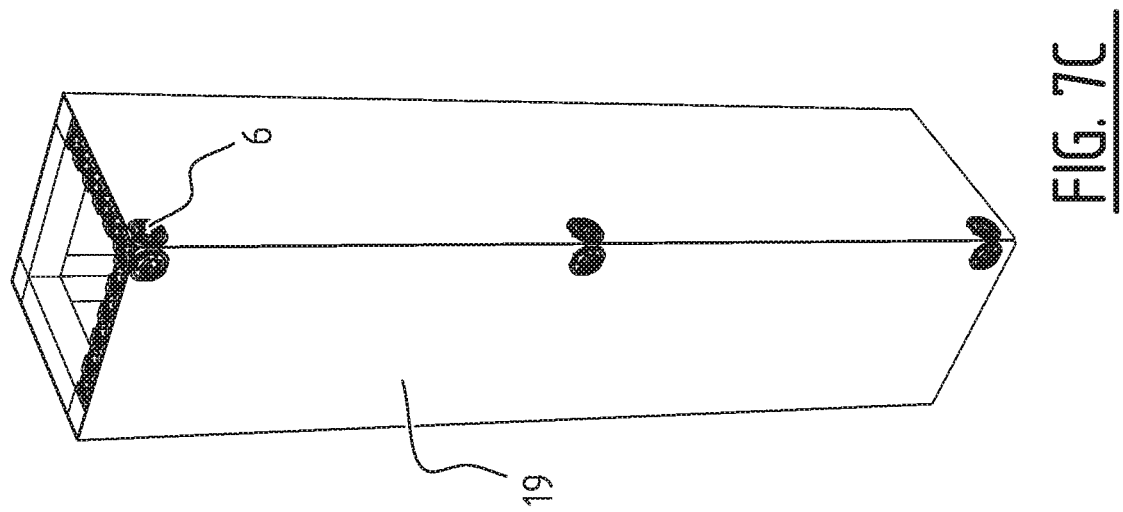
Figure 7B:
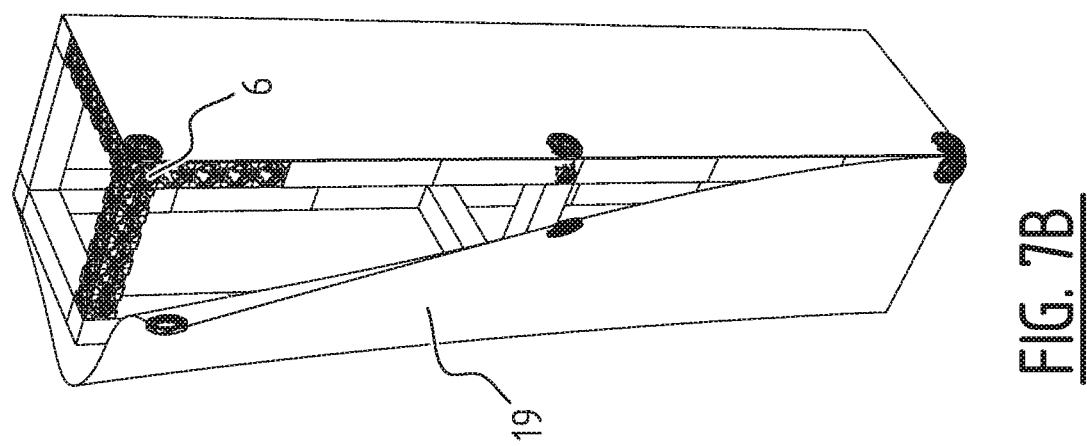
Figure 7A:
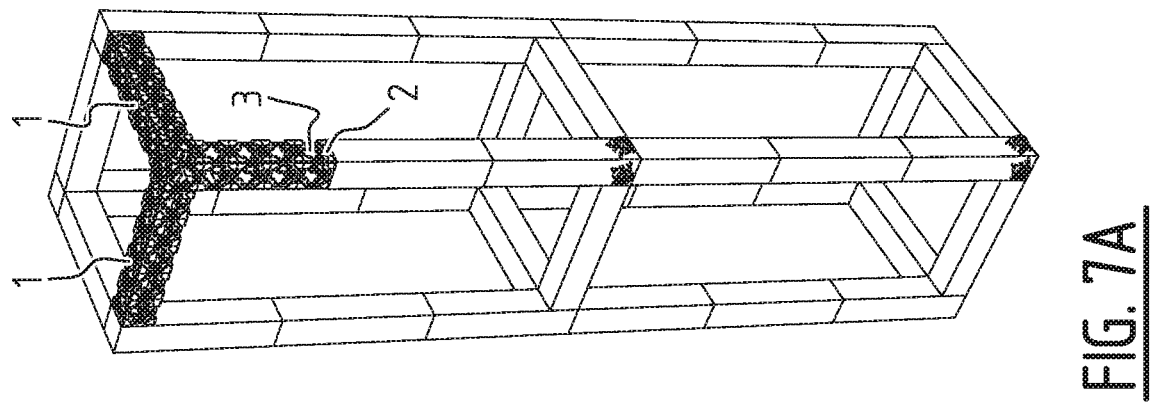
Figure 8A:
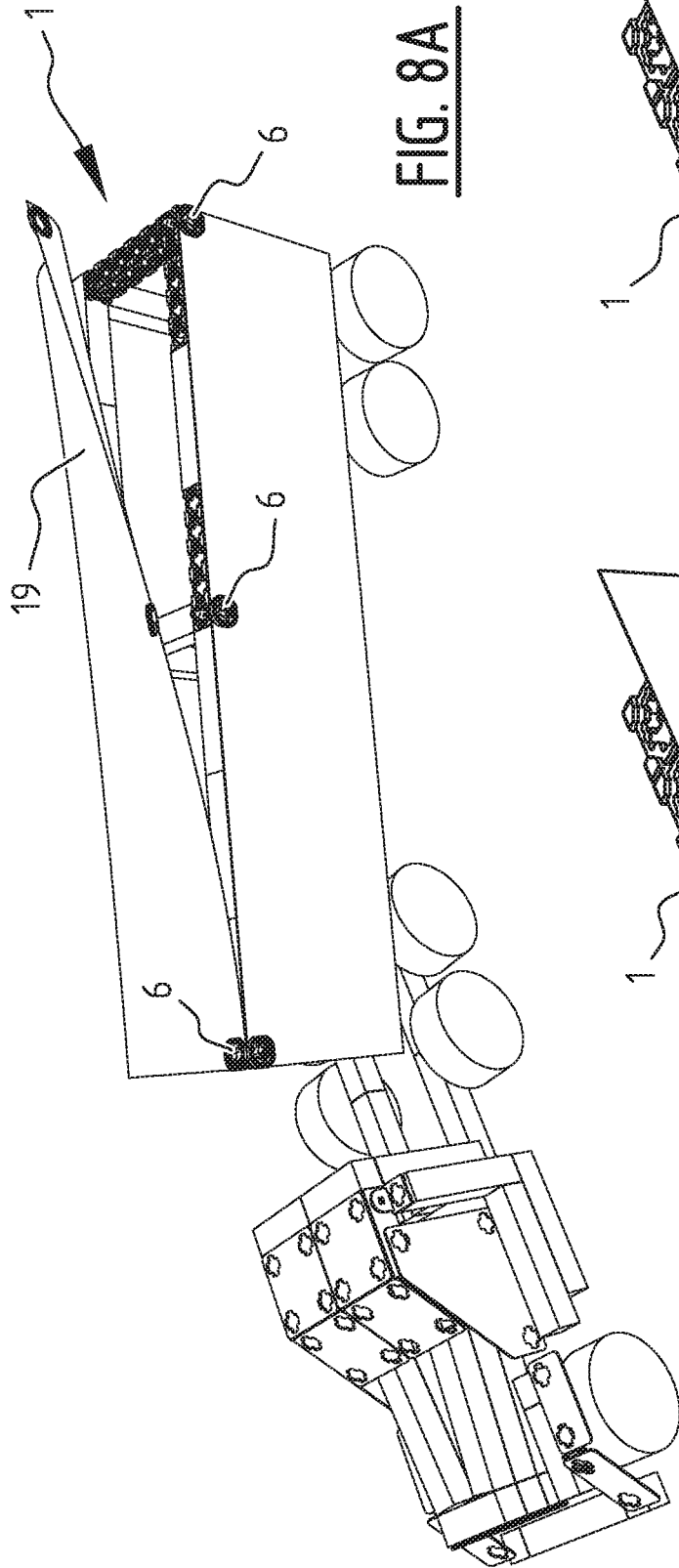
Figure 8C:
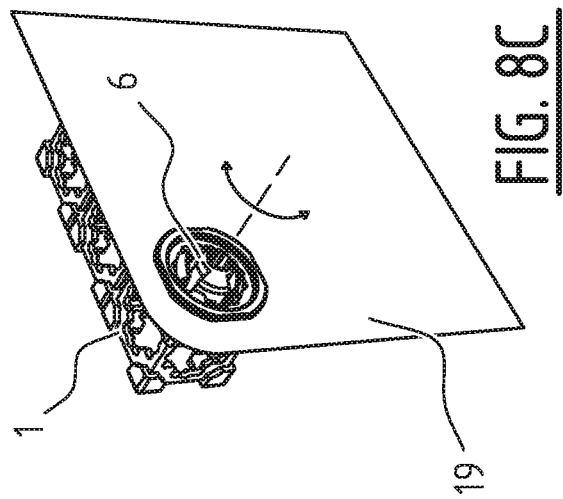
Figure 8B:
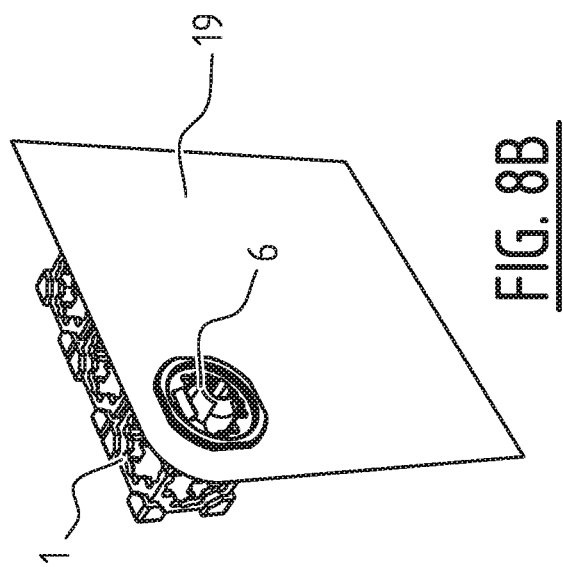
Figure 9A:
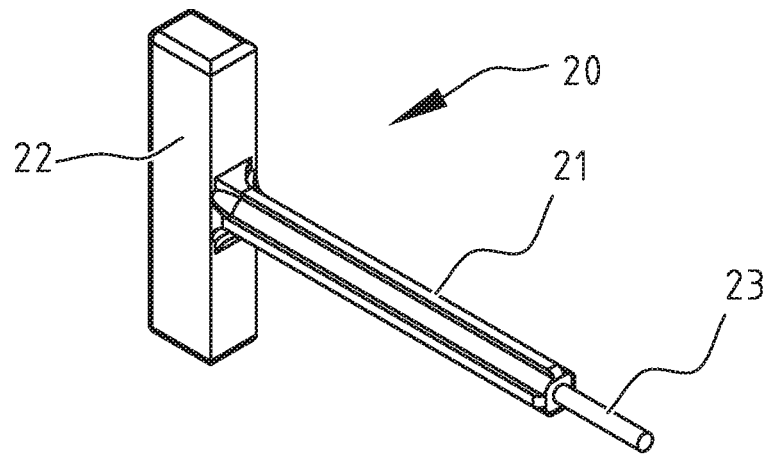
Figure 9B:
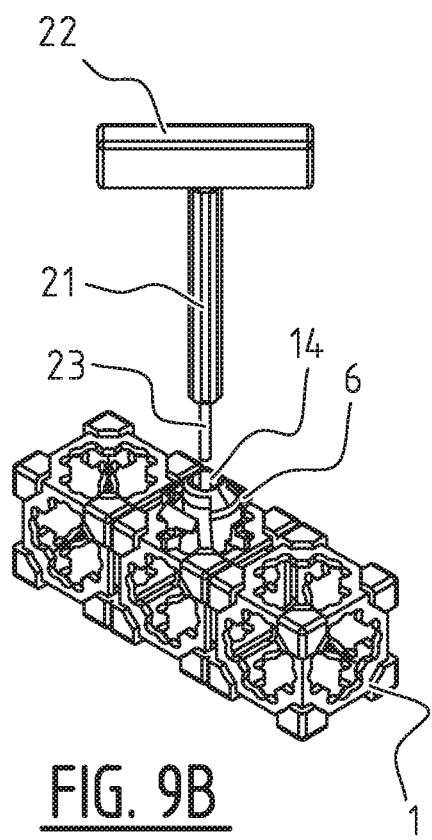
Figure 9C:
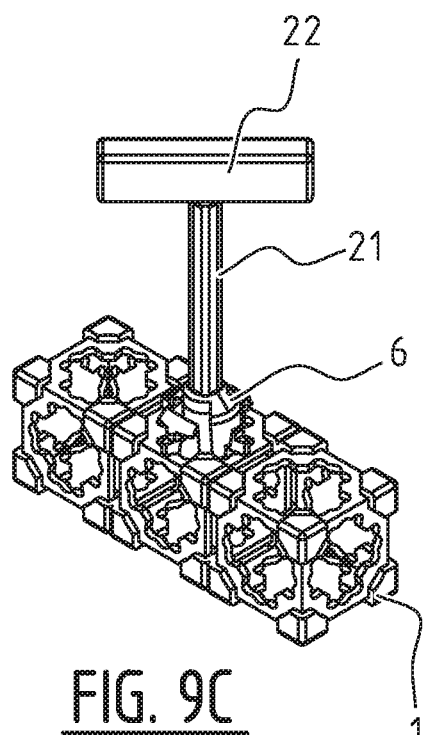
Figure 10A:
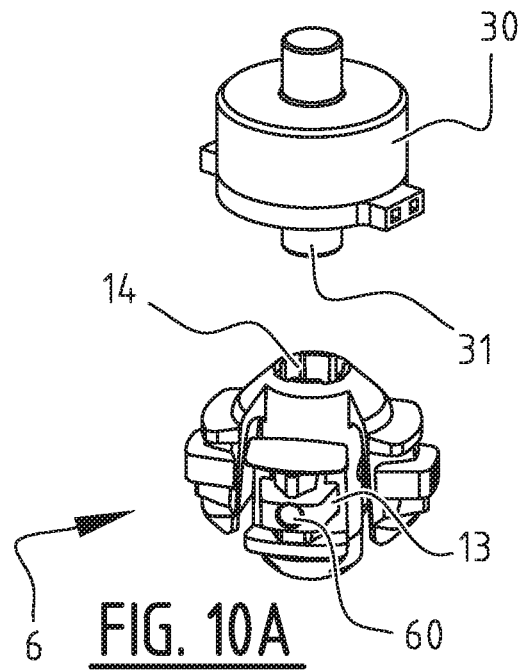
Figure 10B:
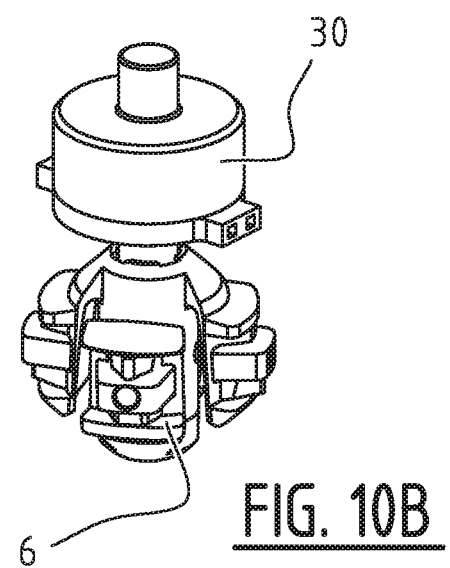
Figure 10C:
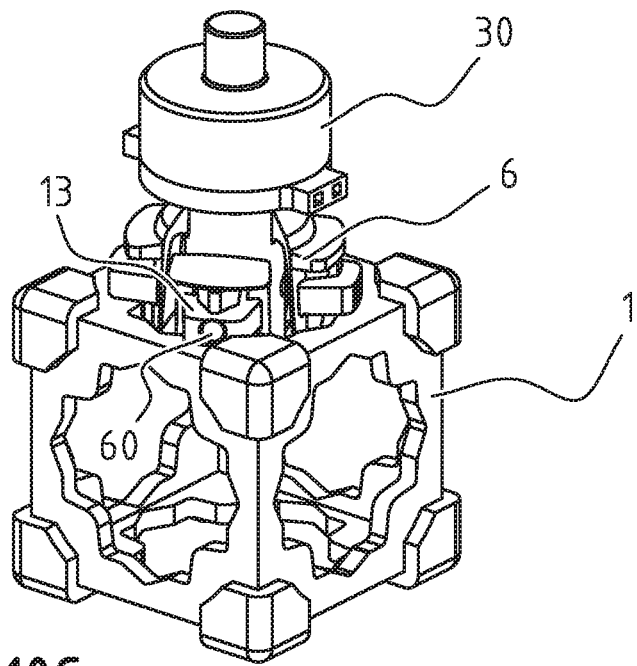
Figure 11A:
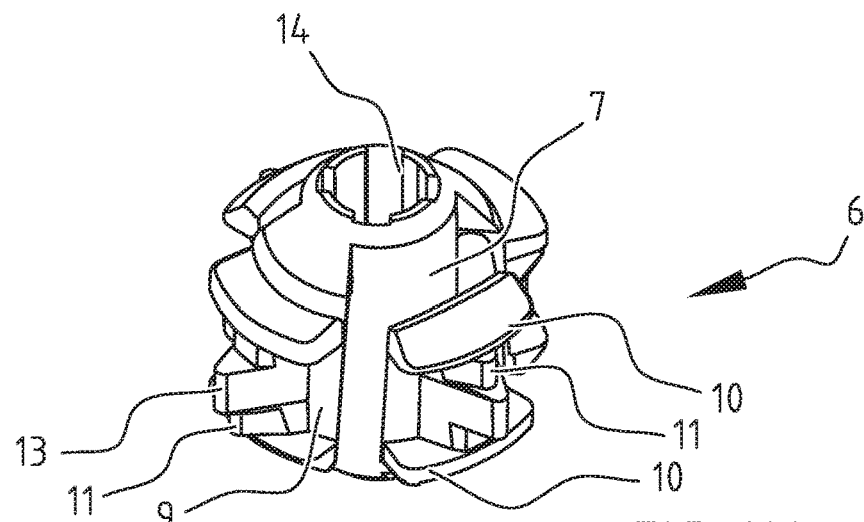
Figure 11B:
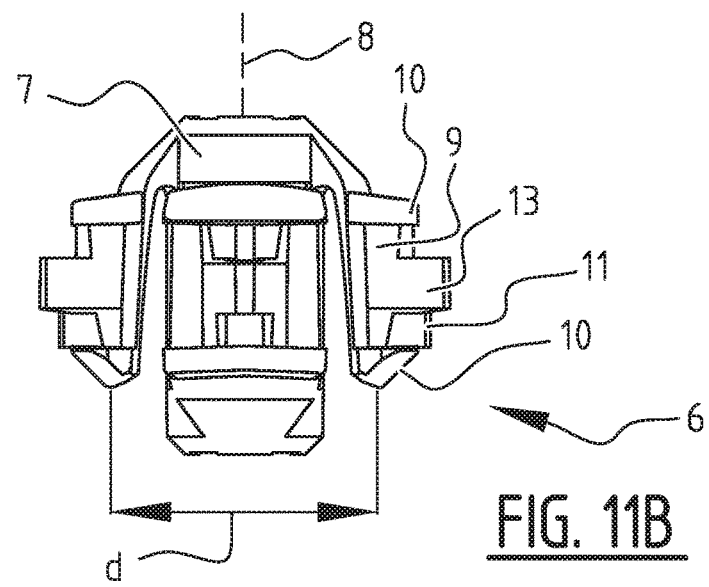
Figure 11C:
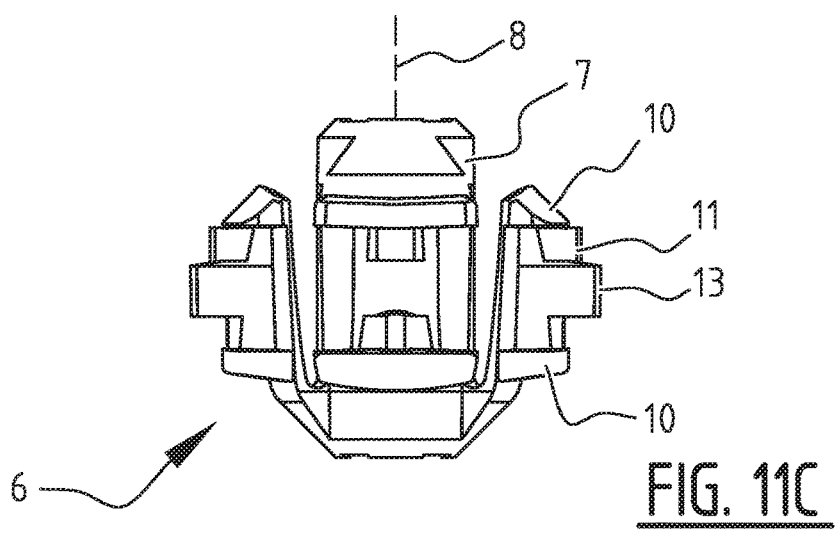

FIGS. 3A-3G show the arrangement and locking of the coupling element of FIGS. 2A-2C in an object from FIGS. 1A and 1B, wherein FIG. 3A is a perspective view of the coupling element and the object in an uncoupled situation, FIG. 3B is a perspective view of the coupling element in the object in a non-locked situation, FIG. 3C is a bottom view of the situation of FIG. 3B, FIG. 3D is a bottom view of a partially rotated coupling element in the object, FIG. 3E shows in detail the coupling element in the situation of FIG. 3D, FIG. 3F is a perspective view of the coupling element in the object in a locked situation and FIG. 3G is a bottom view of the situation of FIG. 3F;

FIG. 4 is a perspective view of a structure created with the modular construction system according to the invention;

FIG. 5 is a perspective view of another structure created with the modular construction system according to the invention;

FIG. 6 is a perspective view of yet another structure created with the modular construction system according to the invention;

FIGS. 7A-7C show perspective views of yet another structure created with the modular construction system according to the invention;

FIGS. 8A-8C show perspective views of yet another structure created with the modular construction system according to the invention;

FIGS. 9A-9C show a tool for rotating a coupling element, wherein FIG. 9A is a perspective view of the tool, FIG. 9B shows arranging of the tool in an opening of the coupling element and FIG. 9C shows rotation of the coupling element using the tool;

FIGS. 10A-10C show coupling of the coupling element to an object in a different manner;

FIGS. 11A-11C show respectively a perspective view and two different side views of a coupling element according to a second embodiment of the invention.

Figure 16:
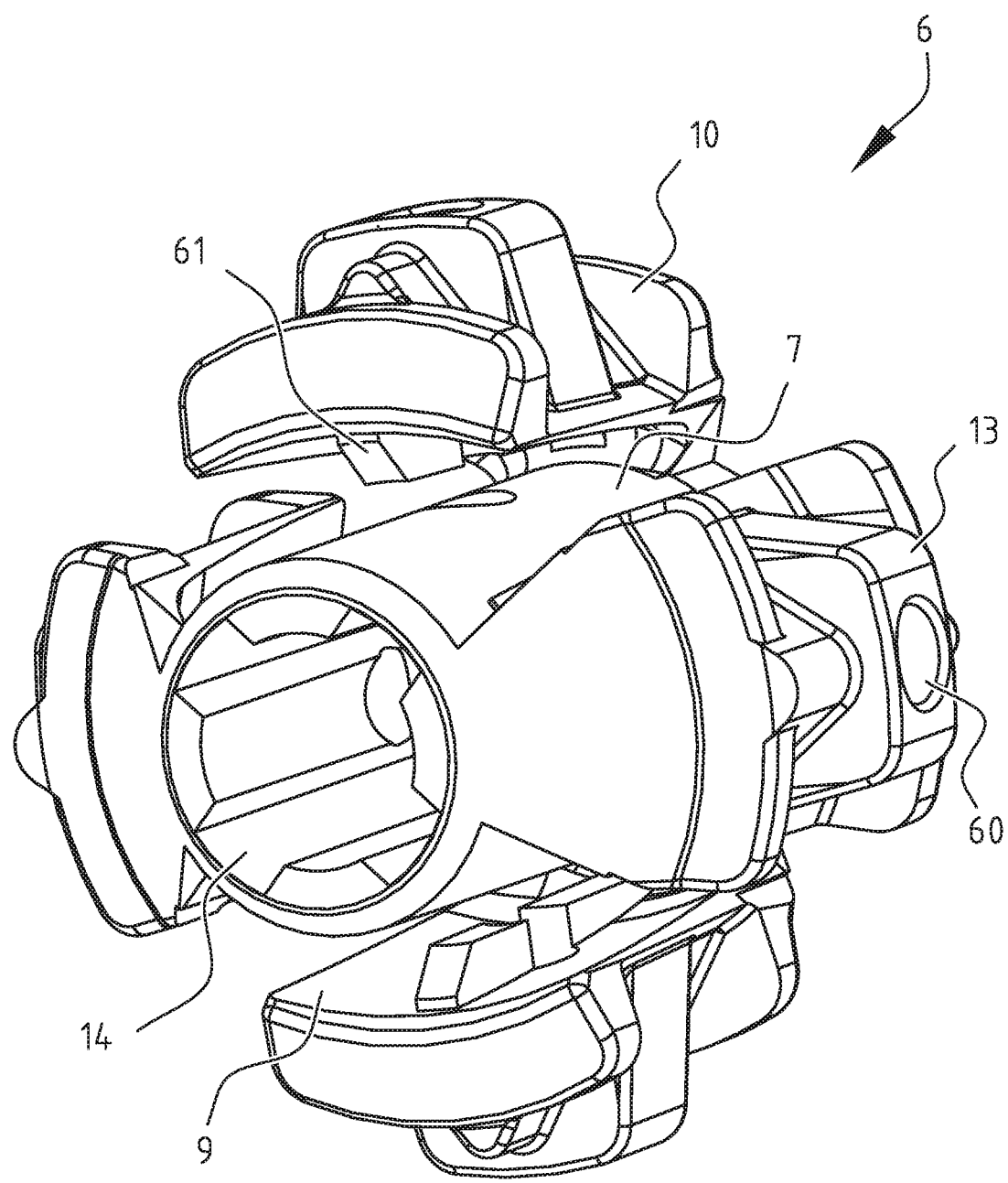
Figure 17A:
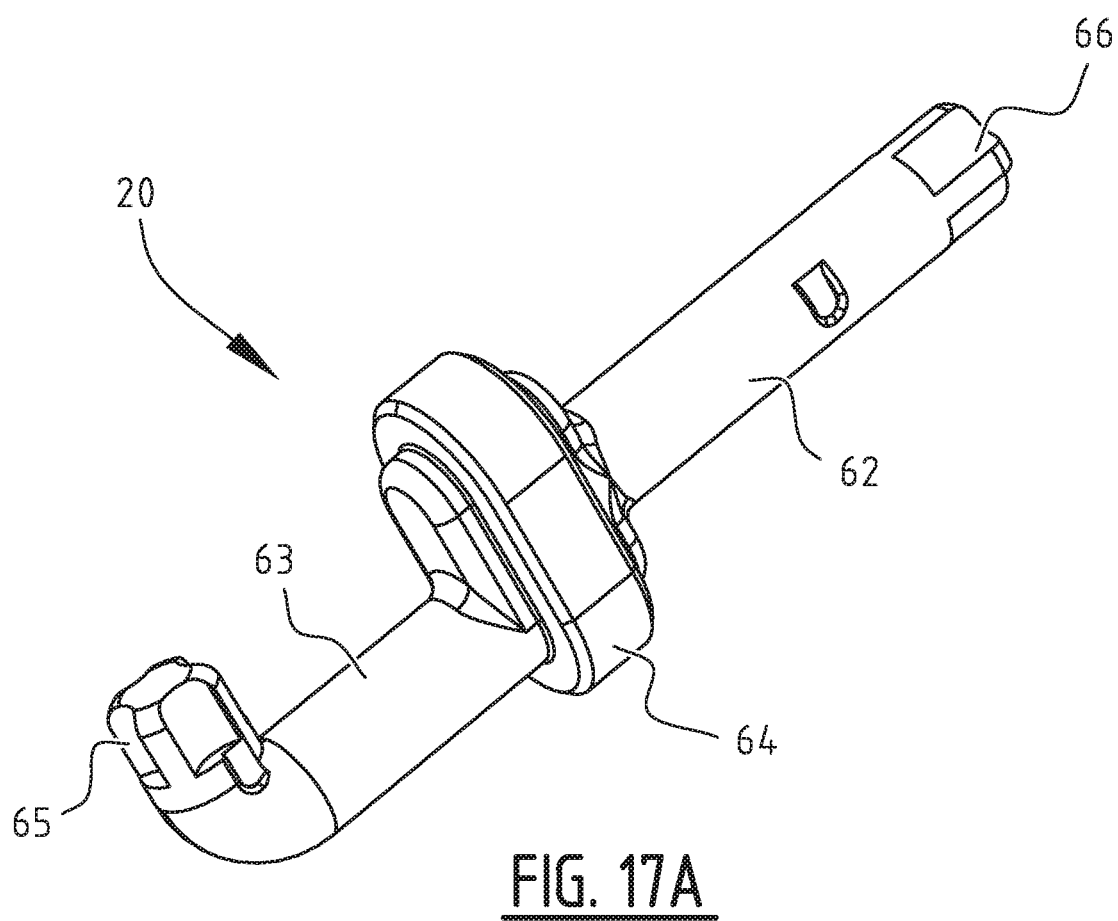
Figure 17B:
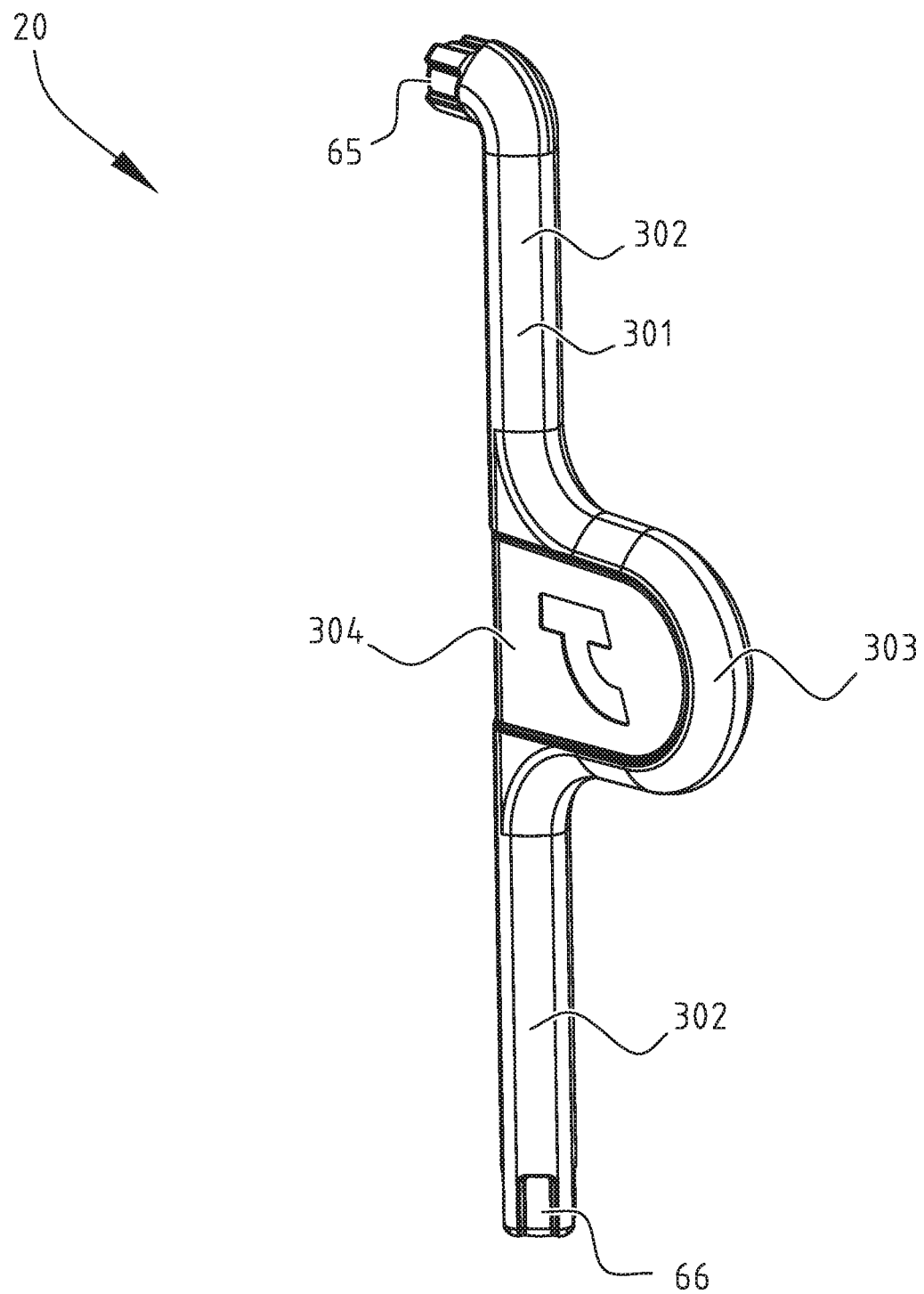
Figure 18A:
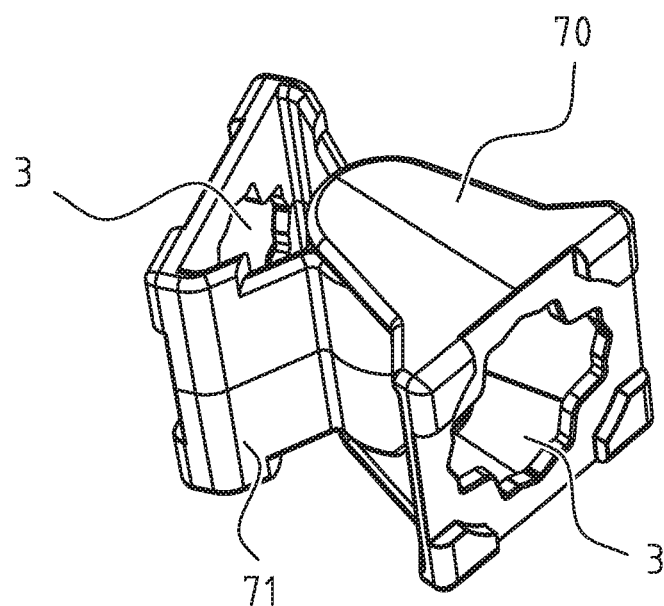
Figure 18B:
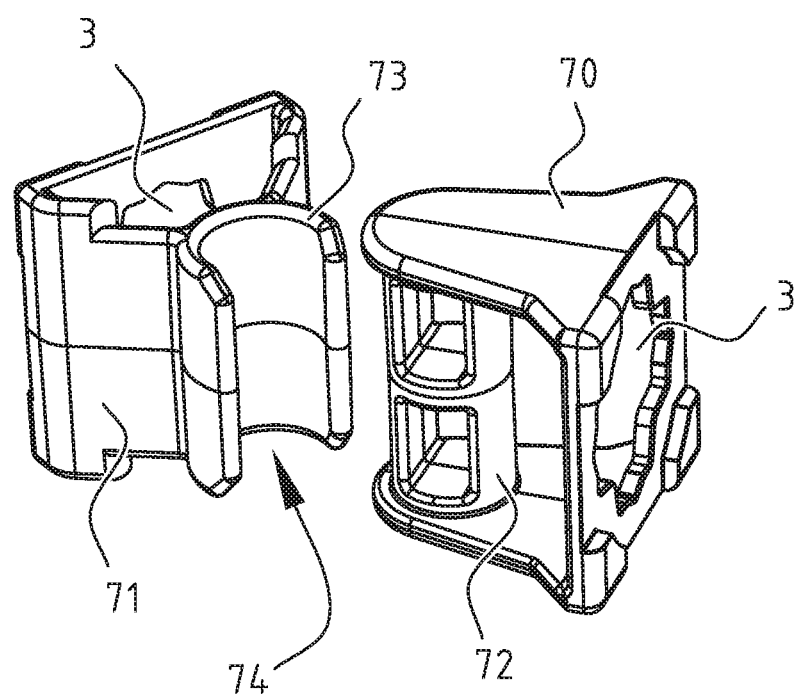
Figure 19A:
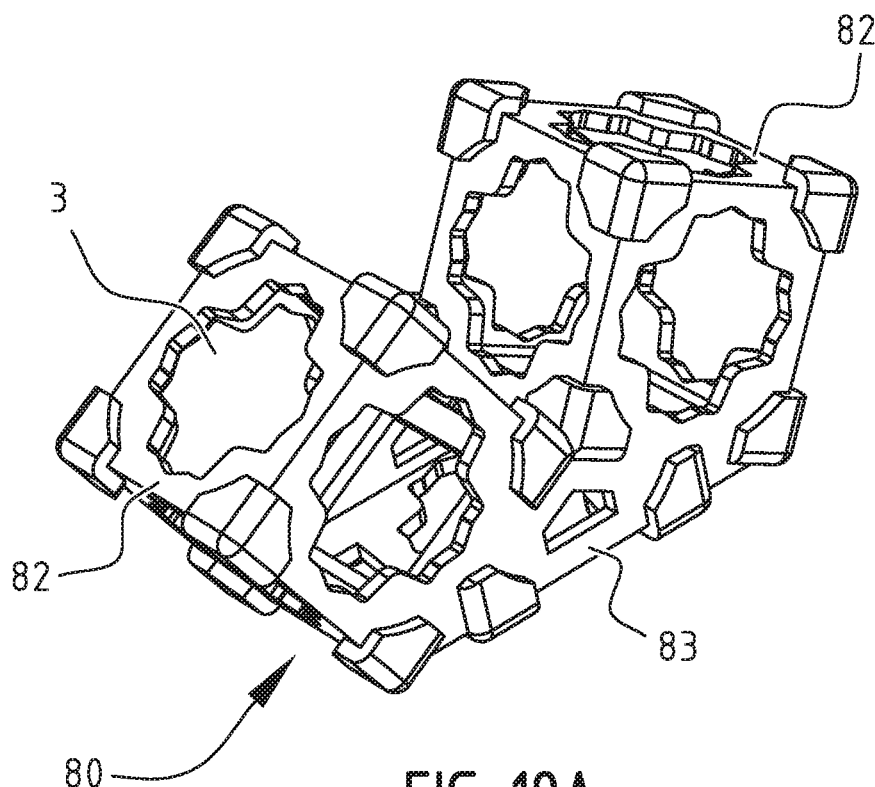
Figure 19B:
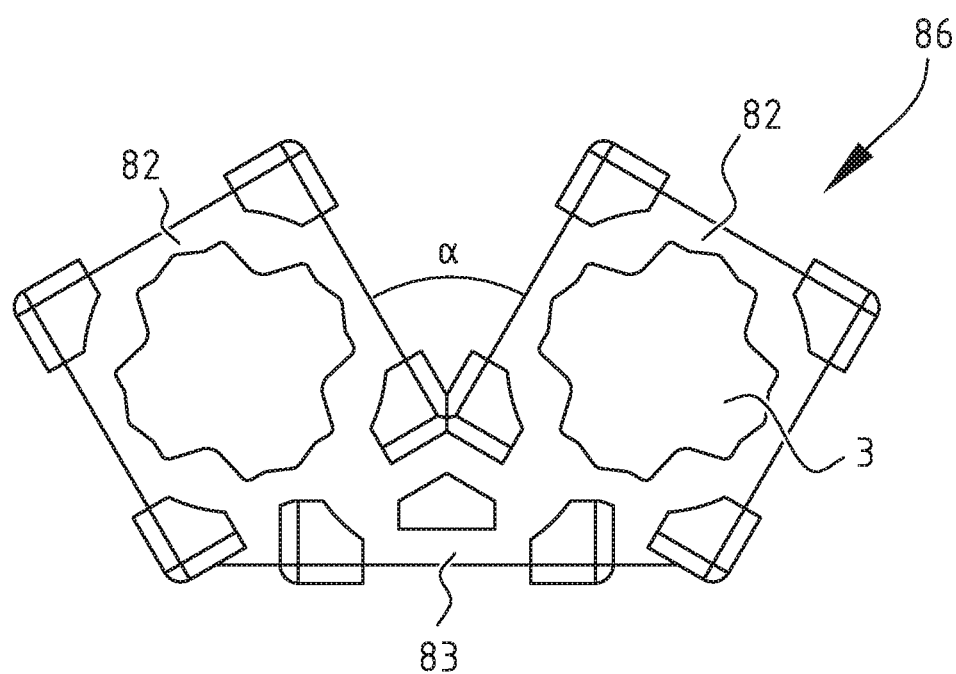
Figure 19C:
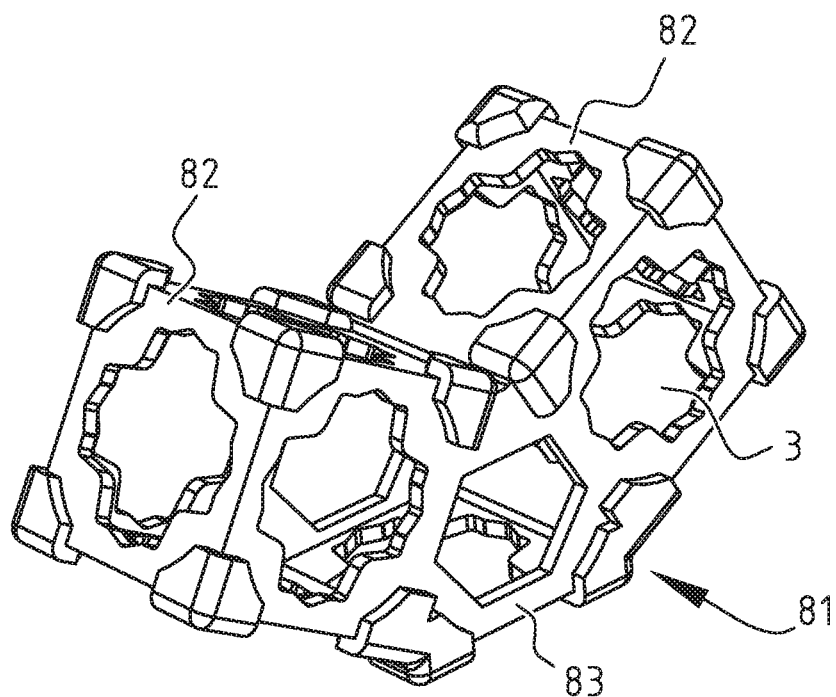
Figure 19D:
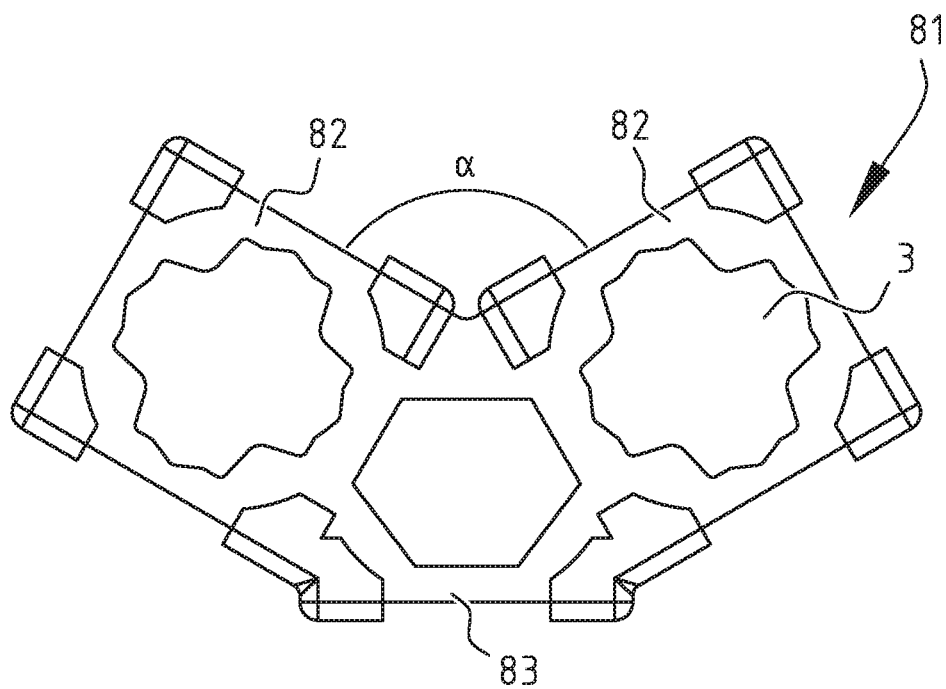
Figure 20A:
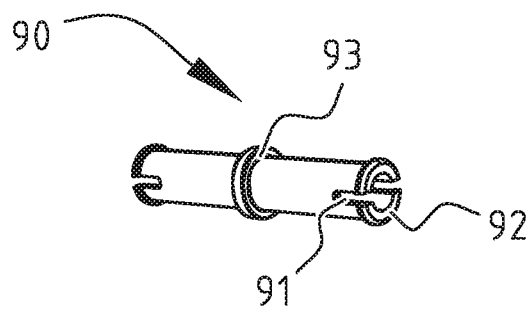
Figure 20B:
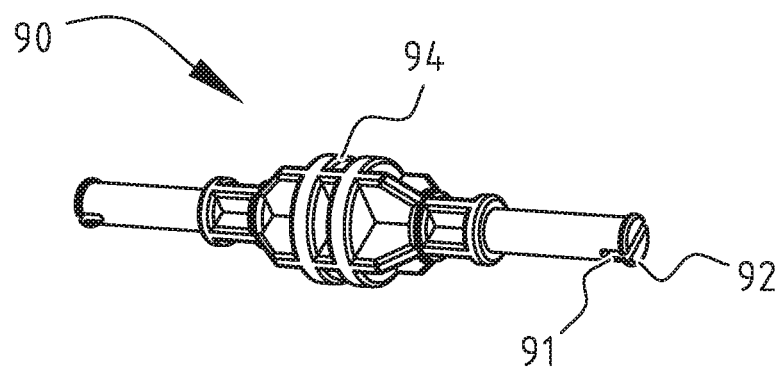
Figure 20C:
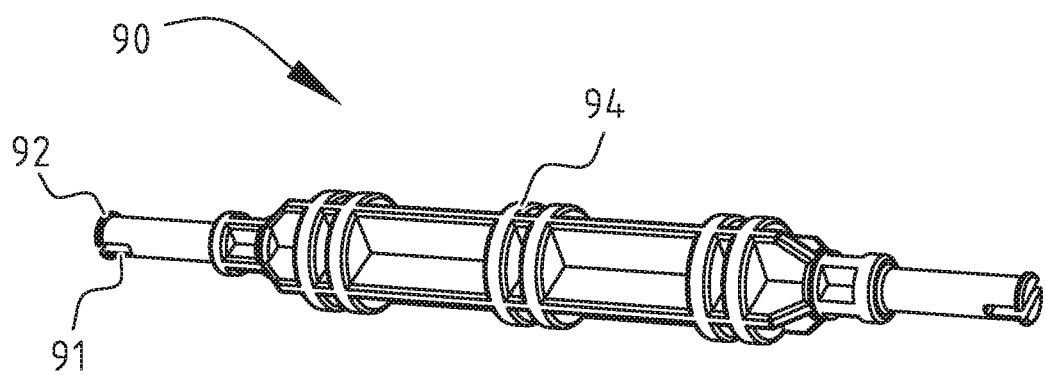
Figure 21A:
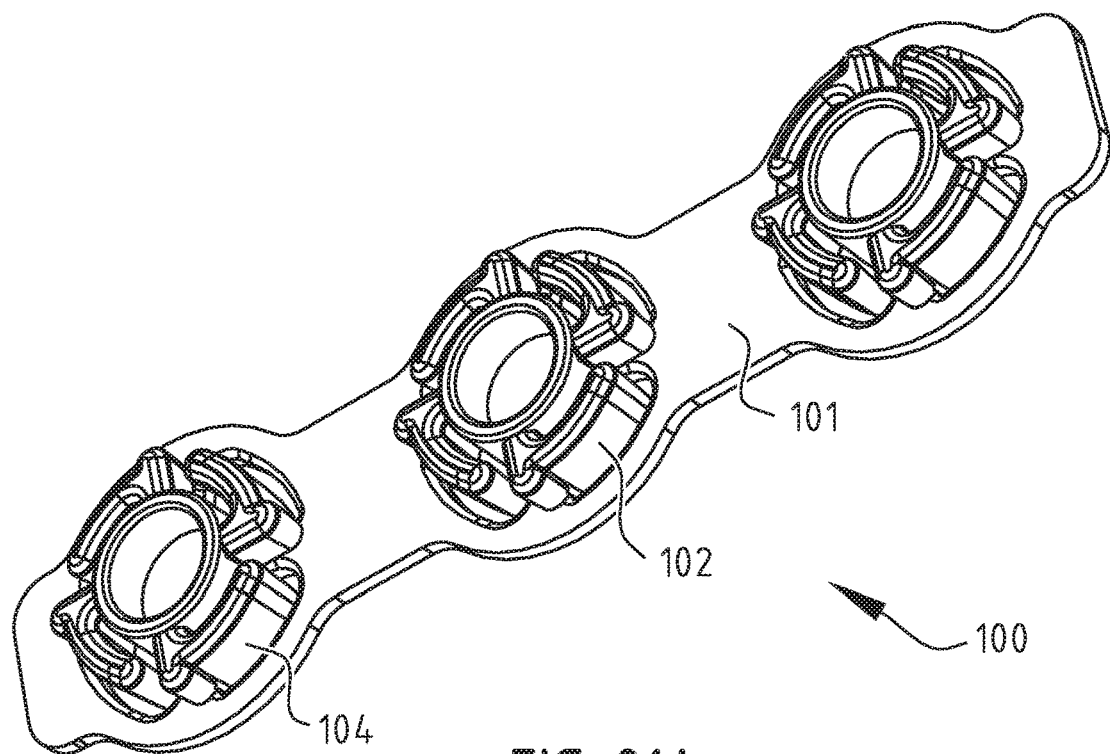
Figure 21B:
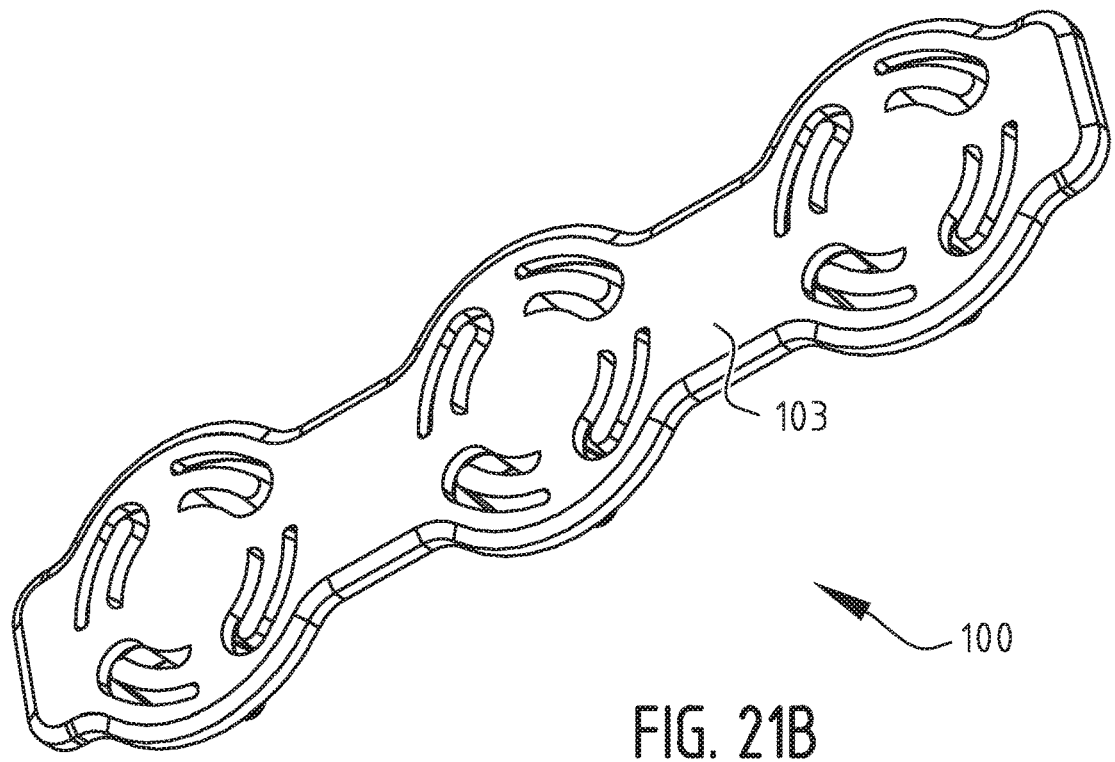
Figure 22:
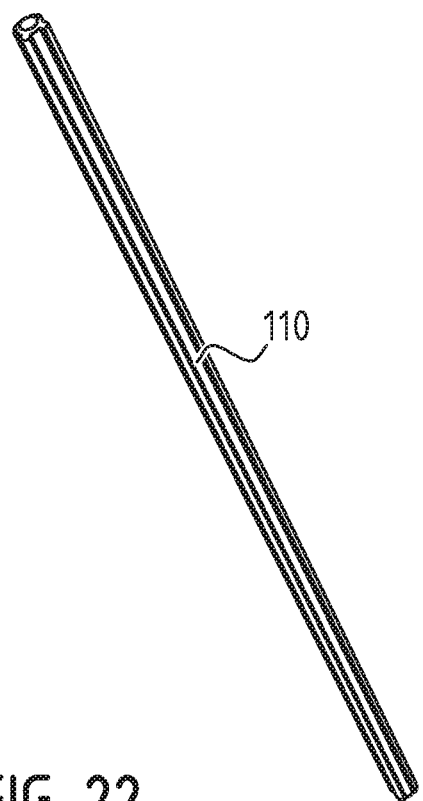
Figure 24:
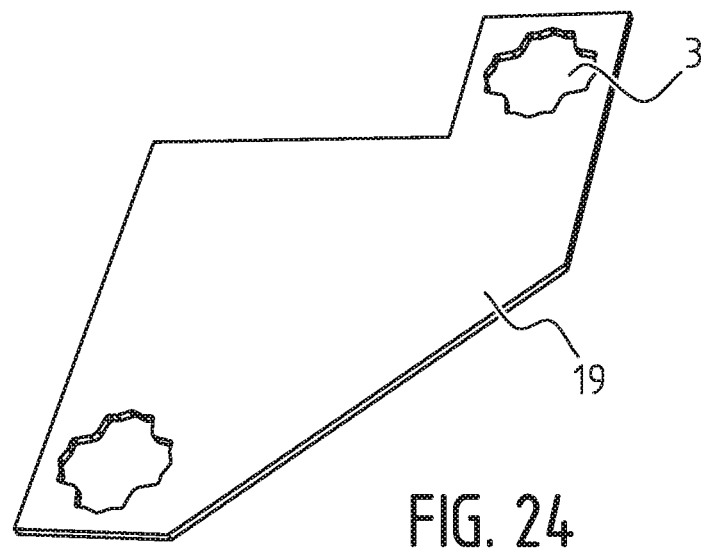
Figure 23A:
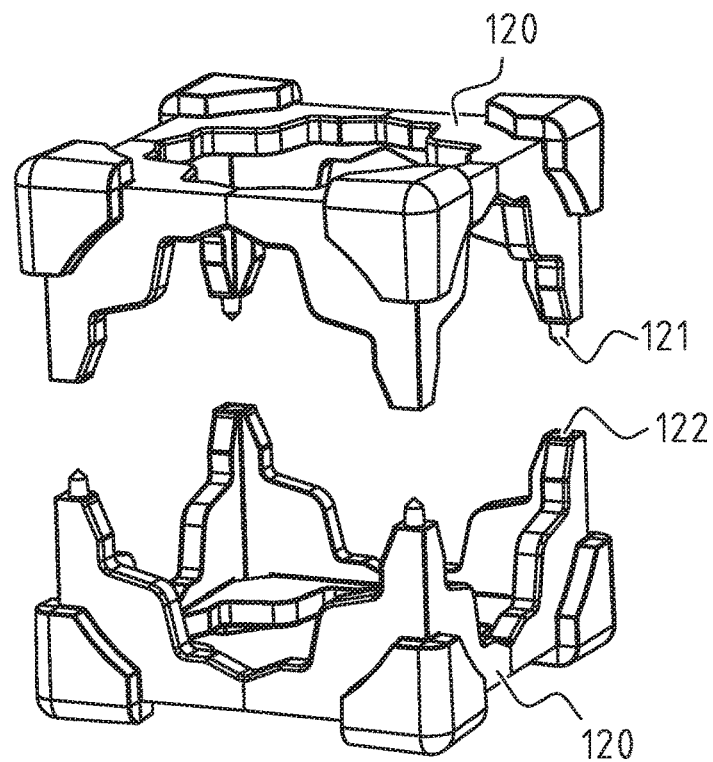
Figure 23B:
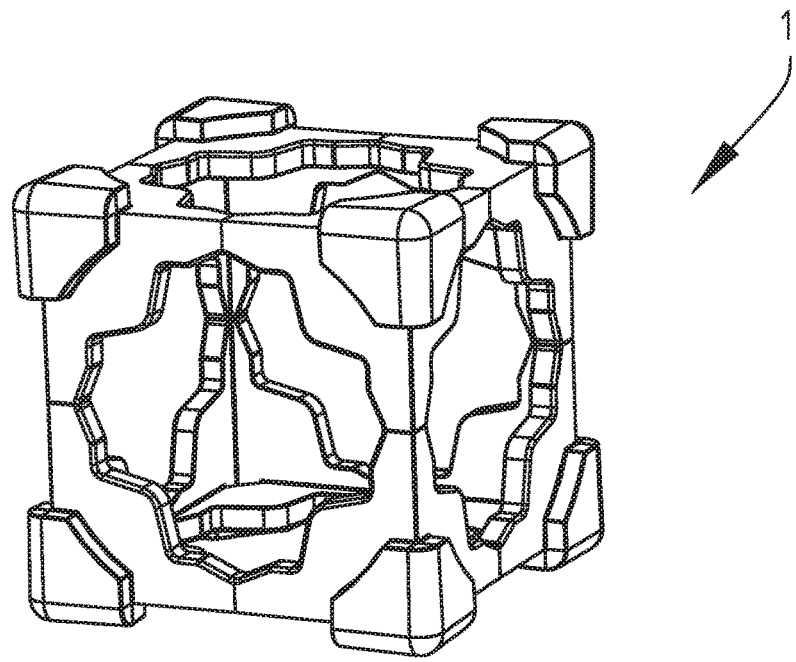
Figure 25:
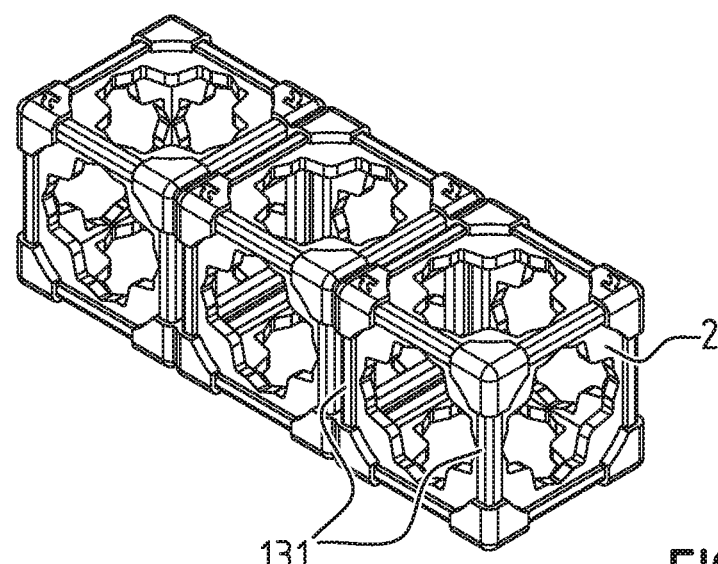
Figure 26:
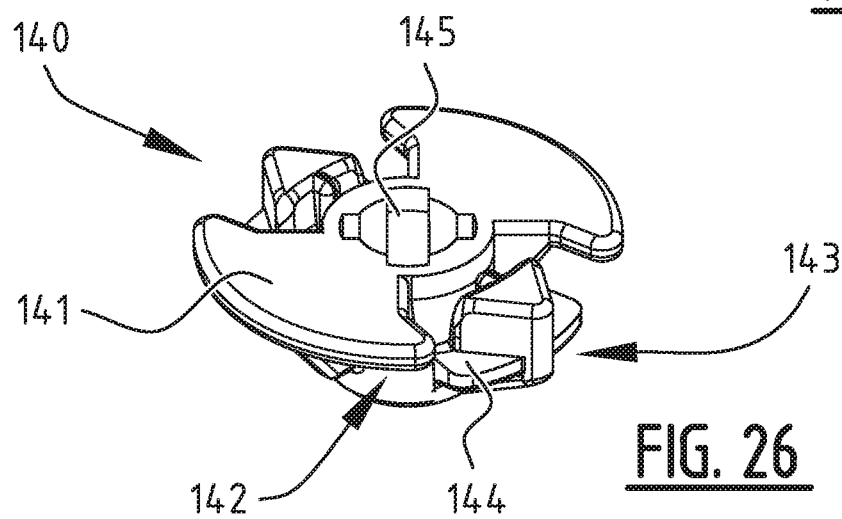
Figure 27:
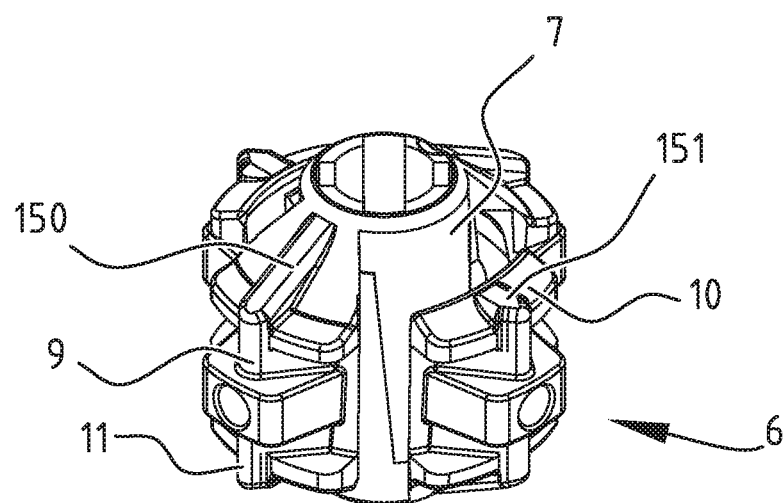
Figure 28A:
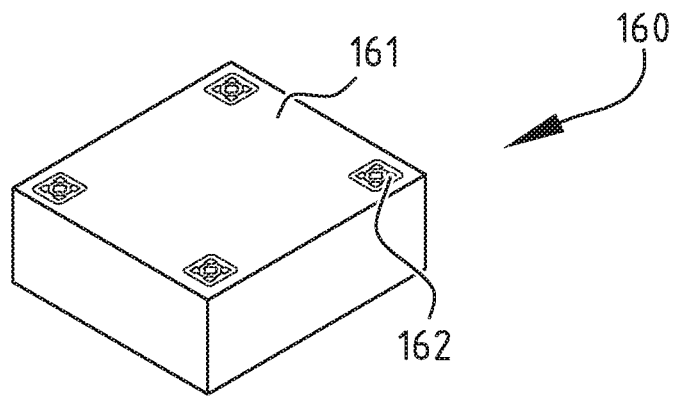
Figure 28B:
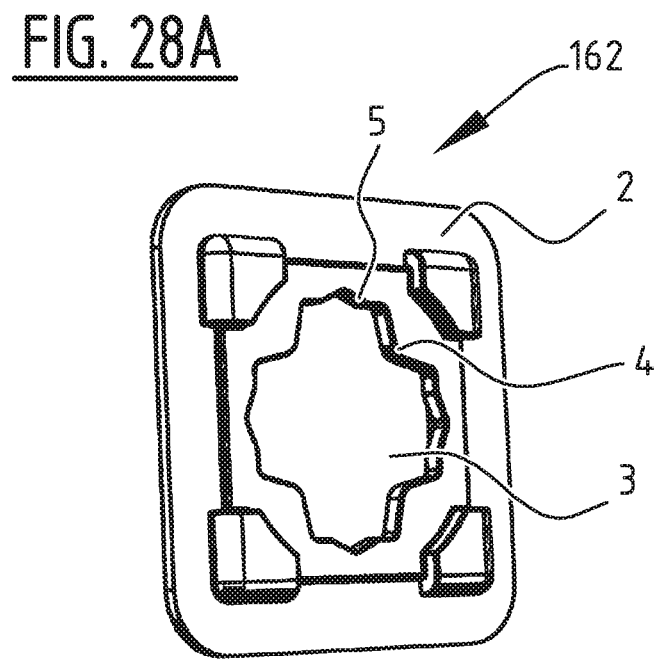
Figure 28C:
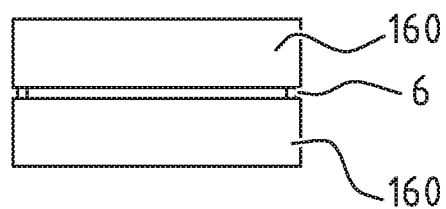
Figure 29A:
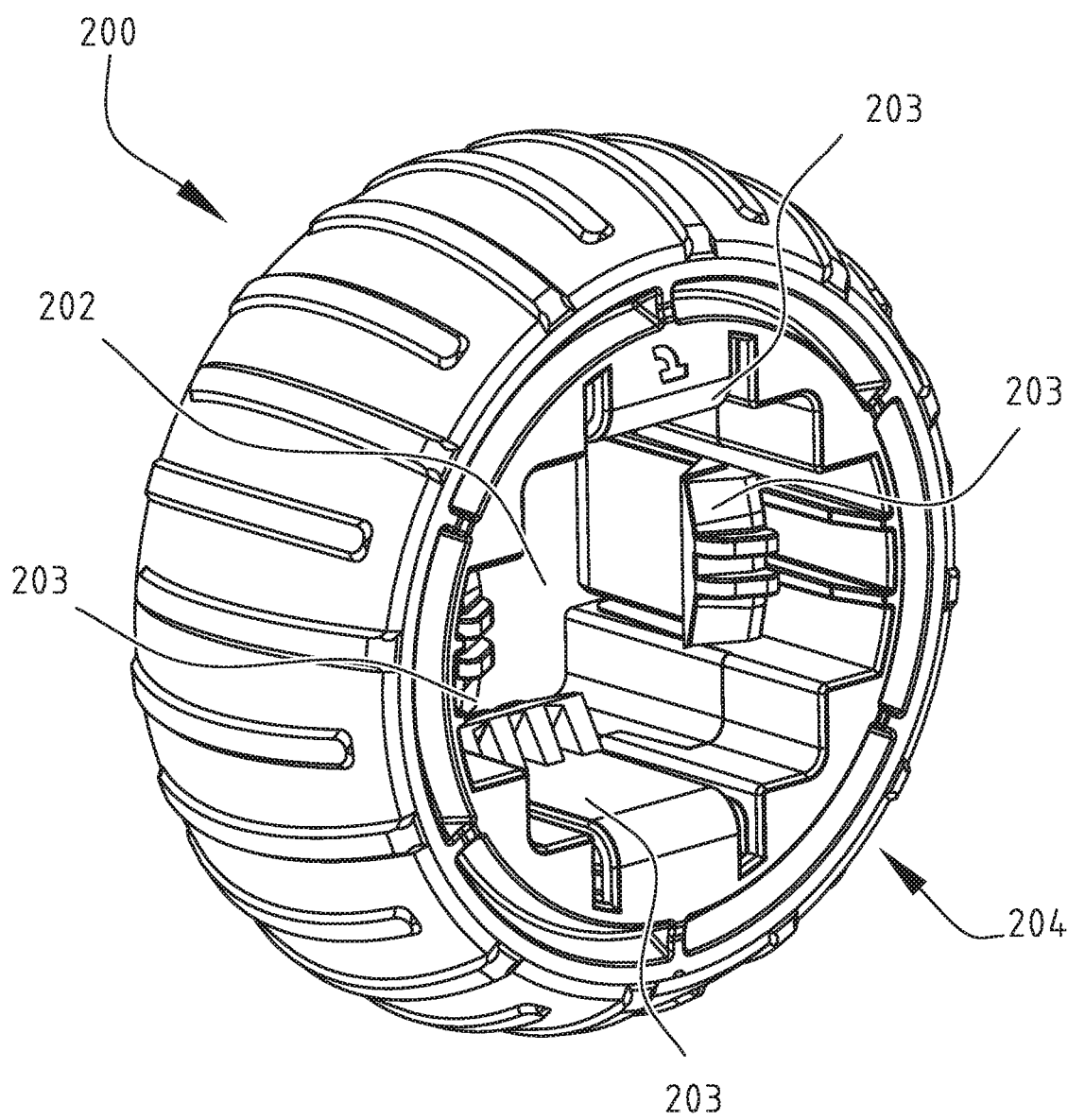
Figure 29B:
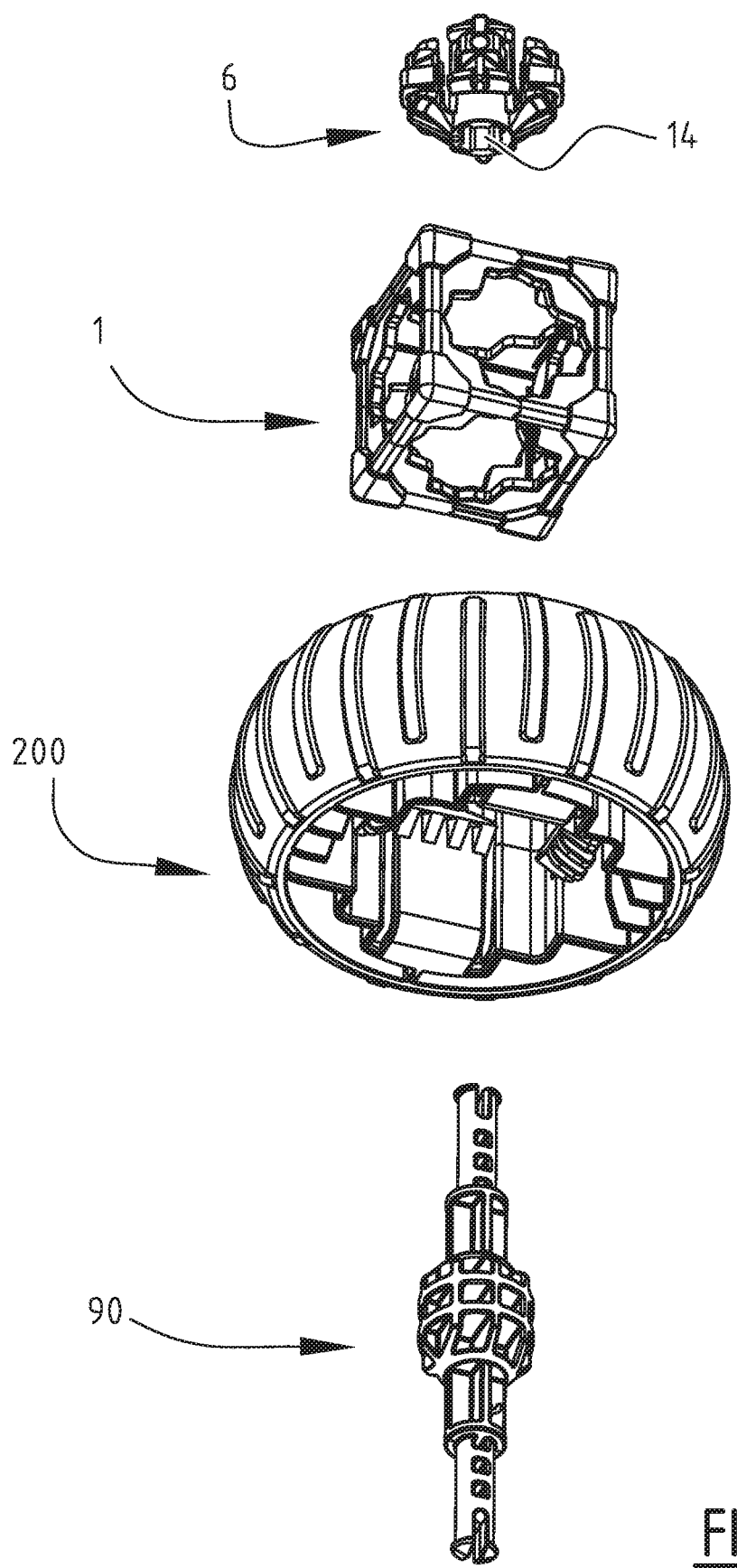
Figure 29C:
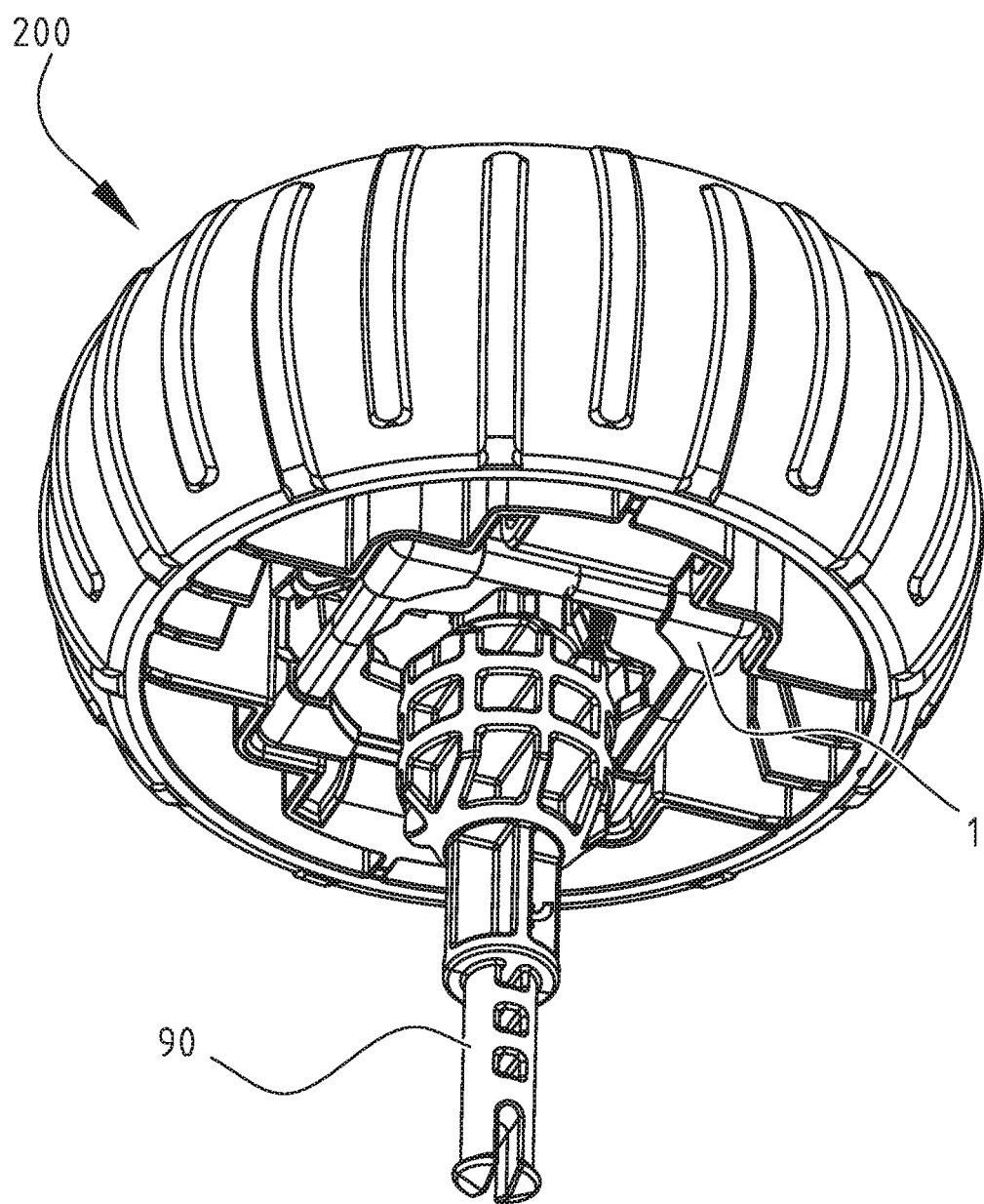
Figure 30A:
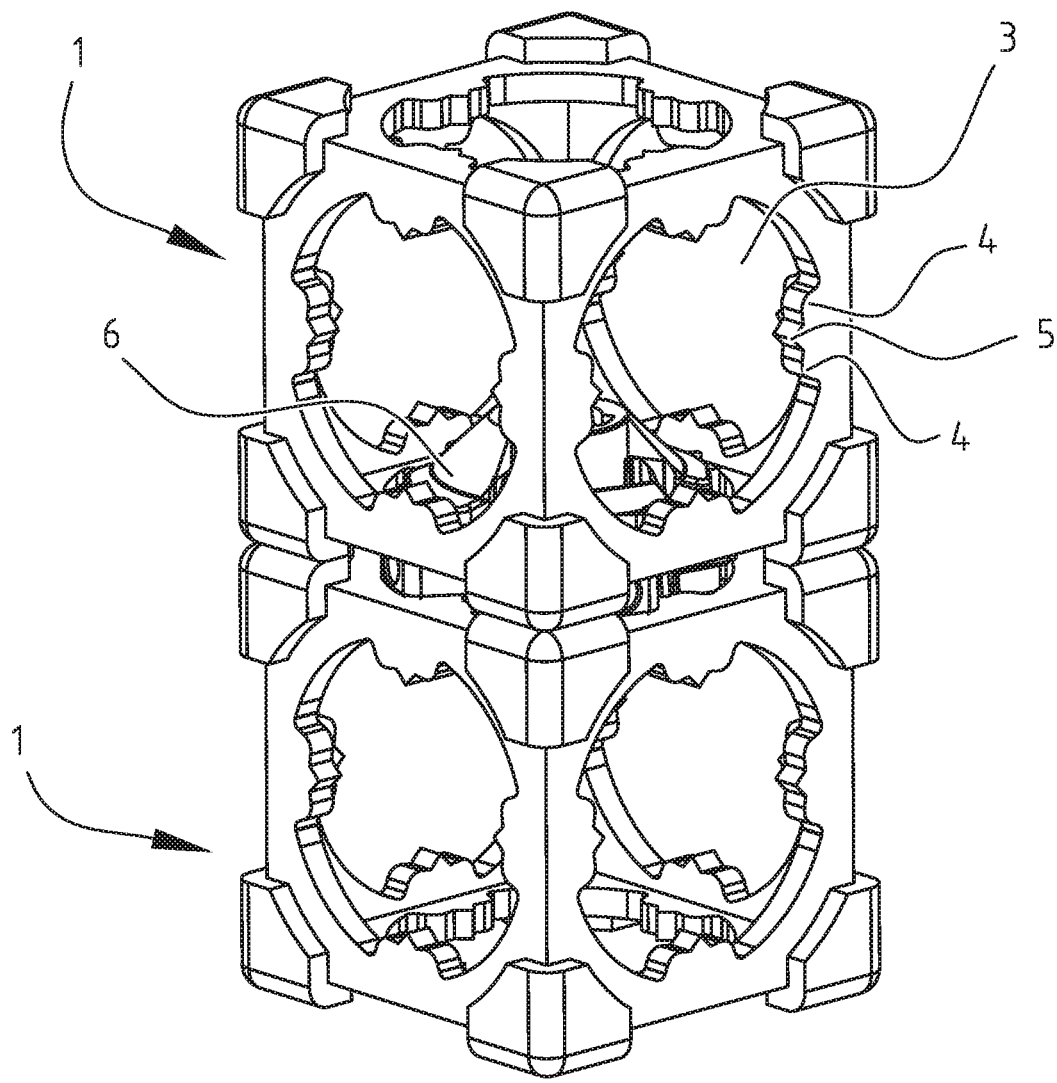
Figure 30B:
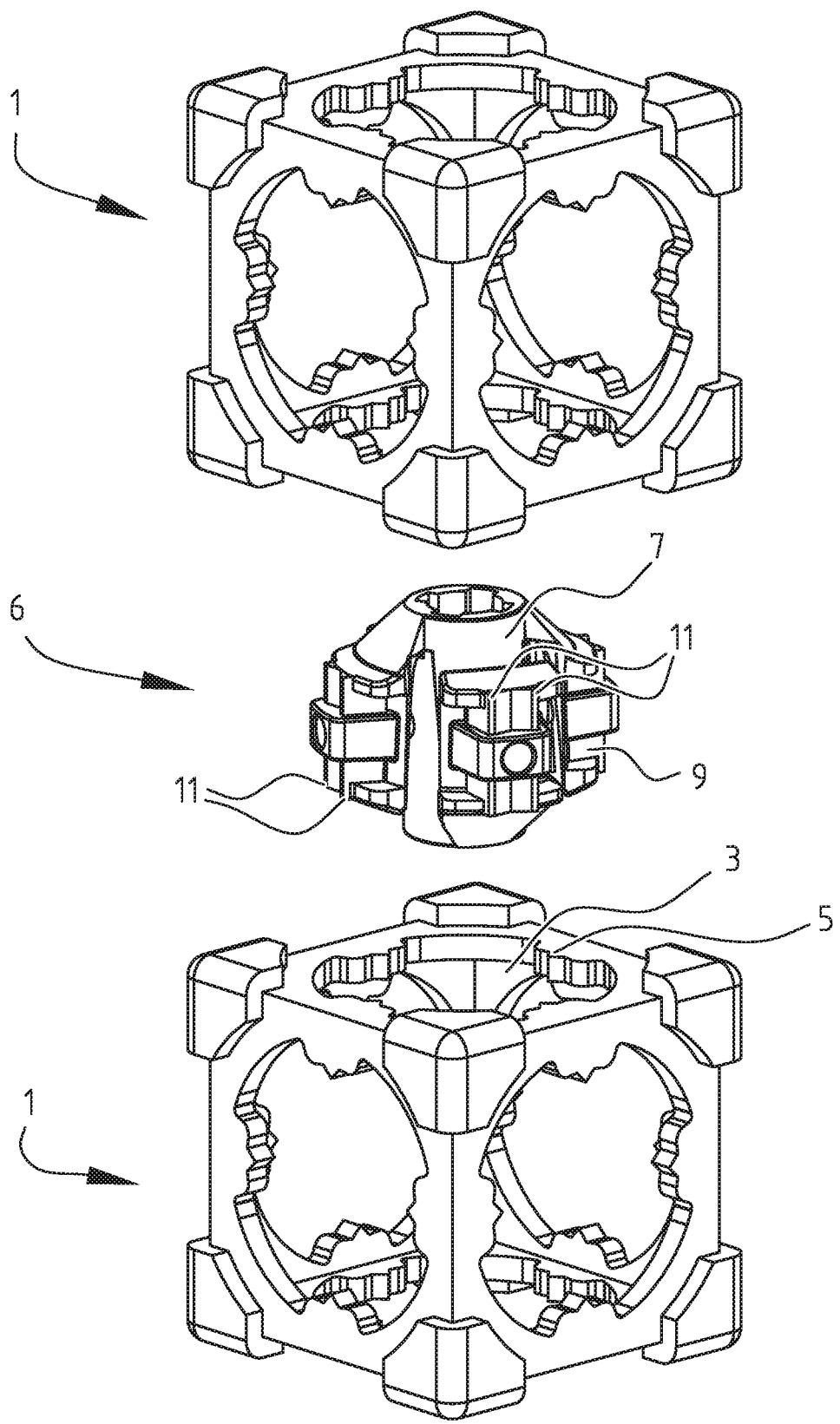
Figure 31:
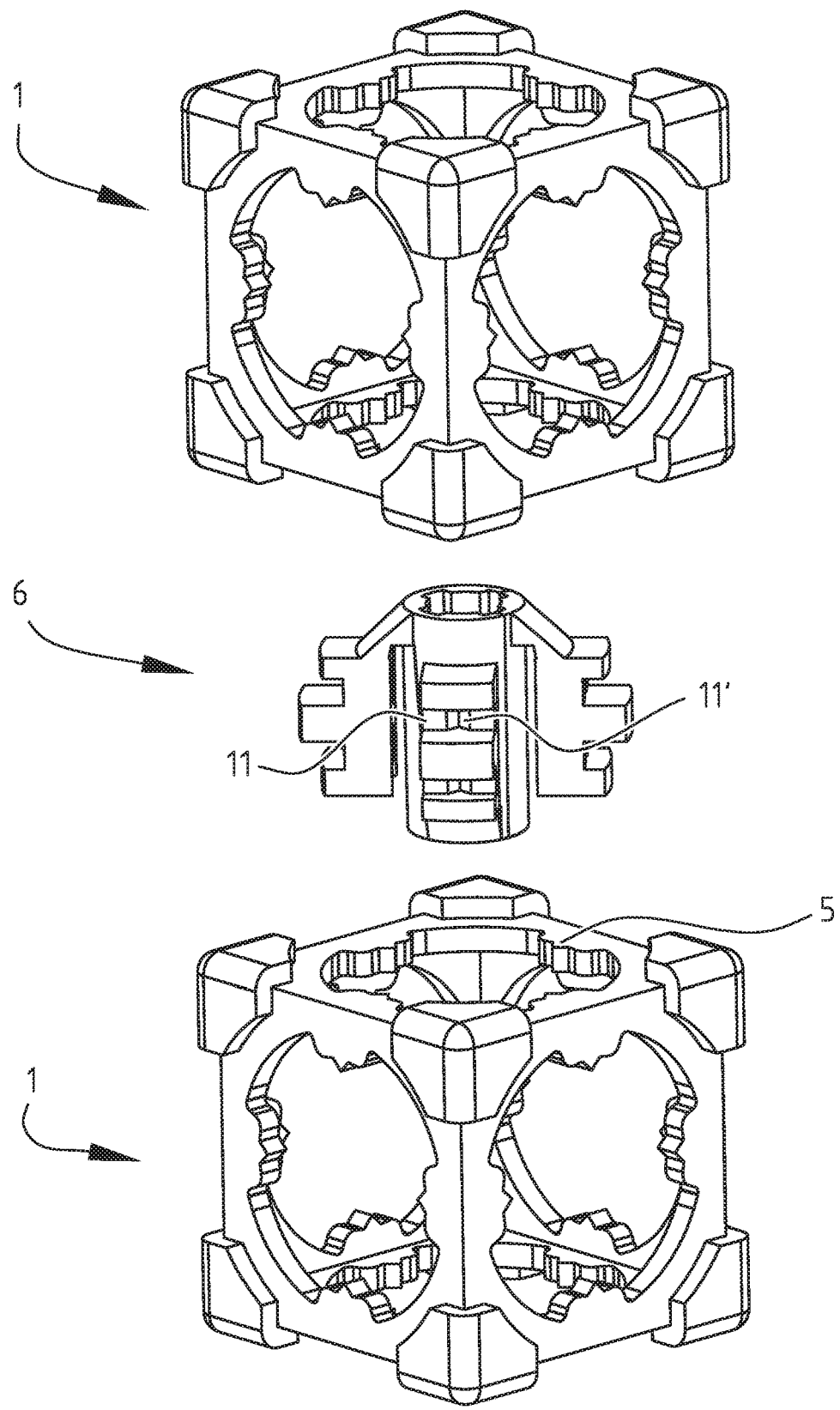

FIGS. 12A, 12B, 12C and 12D are perspective views showing the manner of realizing a coupling between an object and a plate according to the invention;

FIGS. 13A, 13B, 13C and 13D show in a manner corresponding to FIGS. 12A, 12B, 12C and 12D the four steps for forming a coupling between an object and a cord or rope provided with an attaching eyelet in accordance with the teaching of the invention;

FIG. 14A is a side view of an attaching element comprising a shank and a head;

FIG. 14B is a side view of the same attaching element rotated through 90°;

FIG. 14C is a bottom view of the attaching element;

FIG. 14D is a top view of the attaching element;

FIG. 14E is a perspective view of the attaching element;

FIGS. 15A, 15B and 15C show in longitudinal section three stages in the coupling of an attaching element to a coupling element;

FIG. 16 is a perspective view of a coupling element according to a third embodiment of the invention;

FIGS. 17A and 17B are perspective views of a tool according to a second embodiment;

FIGS. 18A and 18B are perspective views of two objects according to other embodiments of the invention, wherein FIG. 18A shows the objects in a coupled state and FIG. 18B in a separated state;

FIGS. 19A-19D are perspective views (19A, 19C) and side views (19B, 19D) of two objects according to other further embodiments of the invention;

FIGS. 20A-20C each show a shaft for use in the construction system according to the invention;

FIGS. 21A and 21B show two different perspective views of a slide plate for use in the construction system according to the invention;

FIG. 22 shows another type of shaft for use in the construction system according to the invention;

FIGS. 23A and 23B show an embodiment of a method for manufacturing an object according to the invention;

FIG. 24 shows an embodiment of a skin plate for use in the construction system according to the invention;

FIG. 25 is a perspective view of an object according to yet another embodiment of the invention;

FIG. 26 shows a slide plate according to a second embodiment of the invention for use in the construction system according to the invention;

FIG. 27 is a perspective view of a coupling element according to a fourth embodiment of the invention;

FIGS. 28A-28C show a packaging for a construction system according to the invention, wherein FIG. 28A is a perspective view of the packaging, FIG. 28B shows a detail of the packaging of FIG. 28A, and FIG. 28C is a side view of two mutually connected packagings;

FIGS. 29A and 29B show in perspective a wheel element according to an embodiment of the invention without (FIG. 29A) and with (FIG. 29B) an object according to the invention therein;

FIG. 29C shows a perspective view of the assembled wheel element and object from FIG. 29B, with the object being arranged within the wheel element, and with a coupling element being arranged in the object and a shaft being arranged in an opening of the coupling element;

FIGS. 30A and 30B show an object and a coupling element according to yet another embodiment of the invention; and FIG. 31 is a perspective view of an object and a coupling element according to yet another embodiment of the invention.

FIGS. 1A, 1B and 2A-2C show an object and a coupling element according to a first embodiment of a modular construction system according to invention.

In this embodiment object 1 is a substantially beam-like object with a total of fourteen surfaces 2, and an opening 3 in each surface 2. Each opening 3 comprises four lips 4 which extend substantially radially inward and which are arranged distributed over the periphery of opening 3 at mutually equal angular distances. In addition, each opening 3 is provided with a total of eight protrusions 5 extending substantially radially inward, wherein two protrusions 5 extend in each case between two lips 4. Lips 4 and protrusions 5 are connected integrally in this embodiment to surface 2 and extend inward from a peripheral edge which defines opening 3.

As further shown in FIGS. 1A and 1B, beam-like object 1 comprises protruding elements, in this exemplary embodiment thickened portions 12, close to all corner zones of all surfaces 2. Object 1 therefore has thickened portions 12 between each two adjoining surfaces 2 as well as close to the corner zones of the object 1 itself. These thickened portions 12 create a distance between adjacent surfaces 2 of optionally coupled objects 1 lying against each other, and thereby an open intermediate space 15 between surfaces 2, see also for instance FIG. 4. This intermediate space 15, which in this exemplary embodiment is narrow or slot-like, serves to accommodate or allow passage of an engaging or insertion limiting element 13 further described below with reference to FIGS. 2A-2C and/or for passage of an engaging part of a tool further described below with reference to FIGS. 9A-9C. This will be further elucidated with reference to FIG. 4.

A slot-like intermediate space 15 is provided for aesthetic reasons between two surfaces 2 of an object 1 disposed in each case in the same plane.

Coupling element 6 comprises a substantially pin-like body 7 with an axis 8 arrangeable in opening 3 of object 1. Body 7 is provided over the outer periphery with a total of four resiliently movable tongues 9 extending therefrom, on which tongues 9 are arranged locking cams 10. A surface 11 of each tongue 9 functions as engaging surface 11 for engagement by a protrusion 5 of object 1, as will be further elucidated below. Surface 11 is particularly a (sub-) front surface of tongue 9, more particularly a (sub-)front surface of a rib 16 extending from tongue 9, particularly a front surface of a projection connected to rib 16, which (sub-)front surface is disposed on a side of tongue 9 remote from pin-like body 7. The resiliently movable tongues 9 are connected in each case at one end thereof to one axial end of body 7 such that tongues 9 are pivotally movable inward between a normal, non-depressed position as shown in FIG. 2B and an inward moved position as will be further shown below in FIG. 3E. In the non-depressed position of FIG. 2B a distance d between two (diametrically) opposite tongues 9 is in this example about 13.75 mm. As shown in FIGS. 2B and 2C, two tongues 9 are connected in each case to the one axial end of body 7 and the other two tongues 9 are connected to the other axial end of body 7. Tongues 9 are connected here to that axial end disposed at the greatest distance from engaging surface 11.

As further shown in FIG. 2A, body 7 of coupling element 6 comprises in this example a continuous opening 14 extending centrally therethrough. This opening 14 can serve to couple coupling element 6 to an object 30, as will be further shown below in FIGS. 10A-10C, or to receive an engaging part of a tool for rotating the coupling element, as will be shown below in FIGS. 9A-9C. In this latter case opening 14 functions as engaging element 14. Continuous opening 14 can also receive a shaft of a circular cross-section, which shaft can in particular rotate freely in opening 14 relative to coupling element 6.

As also shown in FIGS. 2A-2C, tongues 9 each comprise in this example an outward protruding element 13 extending therefrom. This element 13 serves particularly as engaging element 13 for engagement by a tool for rotating coupling element 6 or for engagement by one or more fingers of a user. Element 13 also serves in this exemplary embodiment as insertion limiting element. As soon as element 13 comes to lie against a flat outer side of a surface 2 of an object 1 when coupling element 6 is inserted, coupling element 6 cannot be arranged further into opening 3 of object 1, so that the maximum distance or depth with which coupling element 6 can be arranged in opening 3 can be limited to a maximum insertion distance or depth.

FIGS. 3A-3F show how coupling element 6 can be arranged and locked in object 1 and then uncoupled again. Coupling element 6 is arranged for this purpose in an arranging orientation in an axial direction in opening 3 such that locking cams 10 extend between lips 4 as seen in a rotational direction, see FIGS. 3A-3C. The coupling element is then rotated in a random rotational direction of two possible rotational directions to a locking orientation, see FIGS. 3F and 3G. In the locking orientation the locking cams 10 will extend over lips 4 as can be seen in FIG. 3G, and whereby coupling element 6 is locked in an axial direction in opening 3 of object 1. The locking in axial direction provided by locking cams 10 is particularly a locking against coupling element 6 being pulled out of opening 3. Coupling element 6 can also not be pressed further into opening 3 by insertion limiting elements 13. Coupling element 6 is therefore locked in both axial directions in object 1 using locking cams 10 and insertion limiting elements 13. During the rotation between the arranging orientation and the locking orientation the resilient tongues 9 will move temporarily inward in that protrusions 5 engage on, and thereby exert an inward force on, an engaging surface 11 thereof. This is shown enlarged in FIGS. 3D and 3E. In FIG. 3E coupling element 6 is shown in detail with the tongues located in their inward moved position. In this situation the distance d between the two (diametrically) opposite tongues 9 is in this example about 12 mm. In the locking orientation the resilient tongues 9 move back automatically to their non-depressed position as shown in FIG. 2B because the force on tongues 9 is removed. In its locking orientation coupling element 6 is hereby also locked in the rotational direction. Coupling element 6 is particularly locked here against an opposite rotational movement back to its arranging orientation. For uncoupling purposes coupling element 6 can be rotated in the opposite direction back to its arranging orientation, wherein some force must be exerted to release the locking as seen in rotational direction. The tongues will again move inward here when a force is exerted on engaging surface 11 by protrusions 5 and in the non-locked position, similarly to that shown in FIGS. 3B and 3C, move back resiliently to their non-depressed position. In the locking orientation the coupling element is limited against a further rotation in the same direction as from the arranging orientation to the locking orientation. The limitation in rotational direction takes place with one of the two side surfaces 18 of tongue 9, more particularly one of the two side surfaces 18 of rib 16 of tongue 8, viz. that side surface 18 which, during rotation of coupling element 6 from the arranging orientation to the locking orientation, comes to lie against a side wall of a lip 4 of object 1. Side surfaces 15 extend, as seen in an axial longitudinal direction of coupling element 6, between locking cam 10 and engaging element 13. Side surfaces 18 of rib 16 of tongue 9 thus form rotation limiting means which co-act with lips 4 of object 1.

As further shown in for instance FIG. 3B, engaging element 13 of coupling element 6 protrudes outside the outer periphery or peripheral edge of opening 3 of object 1 on an outer side of surface 2 of object 1. Thickened portions 12 will create an intermediate space between mutually coupled objects 1 lying against each other. Engaging element 13 extends in this intermediate space and is therefore engageable, for instance by an engaging part of a tool. This can be seen for instance in FIG. 4.

It is noted that object 1 and/or coupling element 6 can be embodied in any desired shape in order to enable the creation of different types of structure. Different structures are shown with reference to the FIGS. 4 to 8 further described below in order to illustrate the versatility of the modular construction system according to the invention.

Shown by way of example in FIG. 4 is a first structure made with objects 1 and coupling elements 6 according to the invention. The structure of FIG. 4 comprises three objects 1 as shown in FIGS. 1A and 1B and three other objects 1. The other objects 1 have in this example two hexagonal surfaces 2 between which extend six substantially square surfaces 2. The different objects 1 are connected alternately using a total of six coupling elements 6. As described above, a particularly narrow or slot-like intermediate space 15 is created between adjacent objects 1 by thickened portions 12 between adjacent surfaces 2. This slot 15 is visible in FIG. 4. Engaging element 13 extends in this slot 15 and is thereby accessible by an engaging part of a tool.

FIG. 5 shows another structure made with objects 1 and coupling elements 6. In addition to the above shown objects 1, a substantially cube-shaped object 1 is now also used.

FIG. 6 shows yet another structure made with objects 1 and elements 6. The structure is in this case a toy car. The car comprises a plurality of types of object 1, from which it will be clearly apparent that object 1 can be embodied in any shape. Objects 1 can particularly be beam-like objects of any desired length, wherein the number of surfaces 2 the object 1 comprises can depend on the length thereof. In addition, several objects 1 are embodied as wheels 17. FIG. 6 also shows that object 1 can in this case be a stiff, preformed skin plate 19. Such a skin plate 19 can cover the framework or open structure formed with objects 1 and thus impart a specific desired character and appearance.

FIGS. 7A-7C show yet another structure made with objects 1 and coupling elements 6, this in highly schematic manner. The structure in this example comprises a framework formed by a simple elongate construction, see FIG. 7A, formed with objects 1. An object in the form of a flexible skin plate 19 is arranged around the framework and connected thereto using coupling elements 6, see FIGS. 7B and 7C. Skin plate 19 can be printed with any desired image so that any desired appearance can be imparted to the structure.

FIGS. 8A-8C shows yet another structure made with objects 1 and coupling elements 6. The structure is in this case a toy truck, the trailer of which is covered with a skin plate 19. Skin plate 19 is coupled with coupling elements 6 to the framework which forms the trailer. This takes place in the same manner as elucidated with reference to FIGS.

3A-3G, wherein objects 1 and 19 are mutually connected by coupling elements 6. Skin plate 19 can here also be printed with any desired image.

FIGS. 9A-9C show (the use of) a tool 20 for rotating a coupling element 6. As shown in FIG. 9A, tool 20 comprises a handle 22 and a first engaging part 21. In this example first engaging part 21 is an elongate, pin-like element with a non-round cross-section. In FIG. 9B a coupling element 6 is arranged in an opening of an object 1. Coupling element 6 is in its arranging orientation here. First engaging part 21 of tool 20 can be arranged in continuous opening 14 of coupling element 6. The cross-sectional form of opening 14 here has the same shape as the cross-sectional form of engaging part 21, and is therefore also not round. When first engaging part 21 has been arranged in opening 14, tool 20 can be rotated in one of the two possible rotational directions as described above with reference to FIGS. 3A-3G by gripping the handle 22. Coupling element 6 will hereby be rotated to its locking orientation. Because of the non-round cross-sectional form of opening 14 and of first engaging part 21 coupling element 6 will move together with tool 20 when it is rotated, since first engaging part 21 cannot rotate relative to opening 14.

As further shown in FIG. 9A, the tool further has a hook 23 with which the protruding engaging element 13 can be moved. The hook can be arranged in slot 15 and thus brought into engagement with engaging element 13. Hook 23 thus forms a second engaging part of tool 20. The shape of hook 23 can be chosen as desired. The thickness of hook 23 is preferably adapted to, and in particular smaller than, the transverse dimension of slot 15 so that hook 23 can be arranged in and/or through slot 15.

FIGS. 10A-10C show that opening 14 of coupling element 6 can also be used as coupling opening. In this example an object 30 with a pin-like protrusion 31 is arranged in opening 14 so that object 30 is coupled to coupling element 6. Pin-like protrusion 31 has a round cross-section, whereby object 30 can rotate freely relative to coupling element 6. With its other axial end the coupling element 6 can be coupled in the manner described with reference to FIGS. 3A-3G to an object 1 which in this example is cube-shaped, see FIG. 10C.

FIGS. 10A-10C further show that each engaging element 13 is provided with an opening 60. Opening 60 debouches into central opening 14. Opening 60 can for instance receive hook 23 of the tool so that coupling element 6 can be rotated once hook 23 has been arranged in opening 60. A thread, rope or the like can alternatively be arranged through opening 60. This thread can be guided outside through opening 14, after which a knot can be made in the end of the thread. By providing this knot, or any other random suitable thickened portion, the thread can no longer be pulled outside through opening 60, so that a connection is brought about between the thread and coupling element 6.

It is noted that coupling element 6 of FIGS. 10A-10C is a coupling element 6 according to a second embodiment of the invention. This coupling element will be further specified below with reference to FIGS. 11A-11C.

It is further noted that object 1 of FIG. 10C is an object 1 according to a second embodiment of the invention. This object 1 according to the second embodiment differs from the object according to the first embodiment of FIGS. 1A and 1B in that protrusions 5 between lips 4 have an asymmetrical form. In this specific example each protrusion 5 has substantially the form of a non-equilateral triangle with a rounded apex. Coupling element 6 can be moved here over the one longer side of protrusion 5 during a rotational movement of coupling element 6 in the direction of the apex more easily than over the other shorter side of protrusion 5 during an opposite rotational movement of coupling element 6 in the direction of the apex.

FIGS. 11A-11C show a coupling element 6 according to a second embodiment of the invention. Only the differences from the coupling element according to the first embodiment of FIGS. 2A-2C will be described, and for a further description reference is made to the description above relating to FIGS. 2A-2C. Coupling element 6 according to the second embodiment differs from coupling element 6 according to the first embodiment in that locking cams 10 are arranged on either side of tongues 9 as seen in a longitudinal direction parallel to the axial direction 8 of body 7. In the first embodiment locking cams 10 are arranged on only one side of each tongue 9, in particular close to the free end of tongue 9 not connected to body 7. In the second embodiment locking cams 10 are arranged close to the free end as well as close to the end of tongues 9 connected to body 7.

Figure 12A:
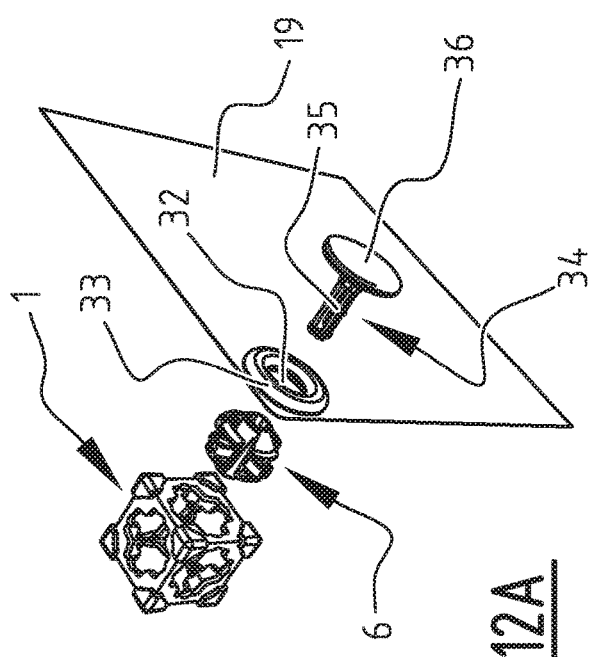

FIG. 12A shows an outline that can be deemed an exploded view of an initial situation in which an object 1, shown in this example as a cube-shaped object, and a coupling element 6 are brought into position so as to be coupled to each other in the manner described in the foregoing. For coupling of an optionally flexible plate 19 to object 1, this plate is provided beforehand with a punched through-hole 32 and a per se known grommet 33 connected non-releasably to the edges of hole 32, i.e. a ring consisting of two sub-rings formed into one whole by means of a curling operation with a machine, and forming a through-hole 32 with a reinforced hole edge in the plate. Made ready on the other side of plate 19 is an attaching element 34 comprising a shank 35 with a widened head 36 on its free end. The details of the embodiment of the attaching element and the manner of coupling to coupling element 6 will be elucidated below with reference to FIGS. 14 and 15.

Figure 12B:
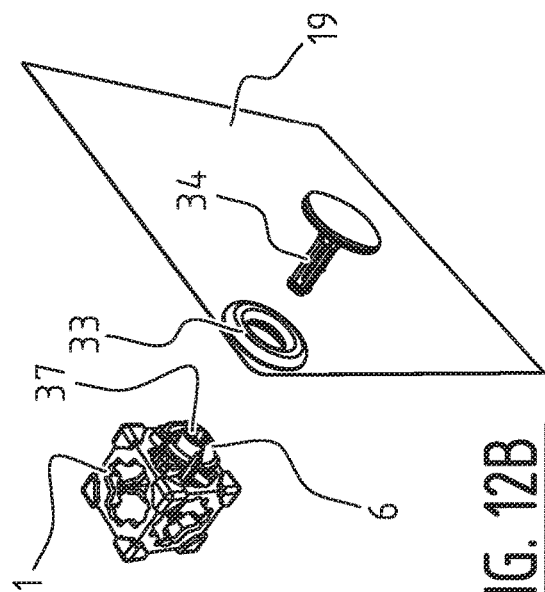

FIG. 12B shows a following stage in which coupling element 6 is coupled to object 1.

Figure 12C:
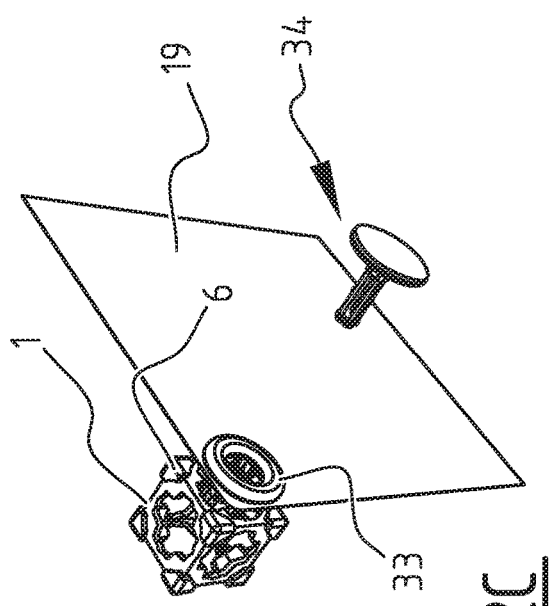

FIG. 12C shows the following stage in which grommet 33 is placed in position in the vicinity of coupling element 6.

Figure 12D:
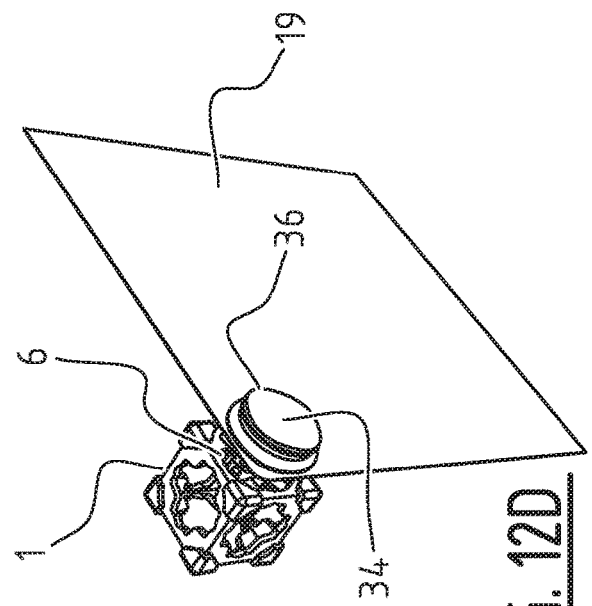

FIG. 12D finally shows that attaching element 34 is placed in its operative position in which plate 19 is fixed in the desired position relative to object 1. Shank 35 of the attaching element is for this purpose inserted through the eyelet and through-hole 32 into sleeve 37, i.e. the central continuous space 14 in coupling element 6. In a manner to be described below attaching element 34 is lightly secured in this drawn position, i.e. locked but, using some force, removable again.

Figure 13A:
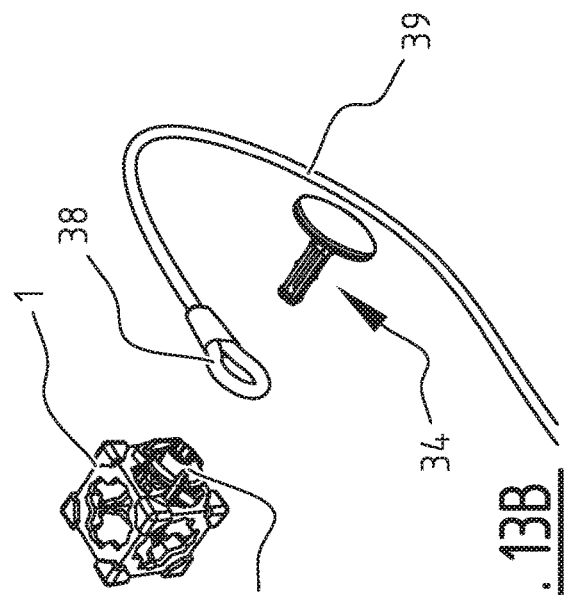

FIG. 13A is an exploded view functionally corresponding to the exploded view of FIG. 12A. In the embodiment according to FIG. 13 however, it is not a plate but a cord 39 that is coupled to object 1. Cord 39 is provided for this purpose in per se known manner with a loop 38 on its end.

Figure 13B:
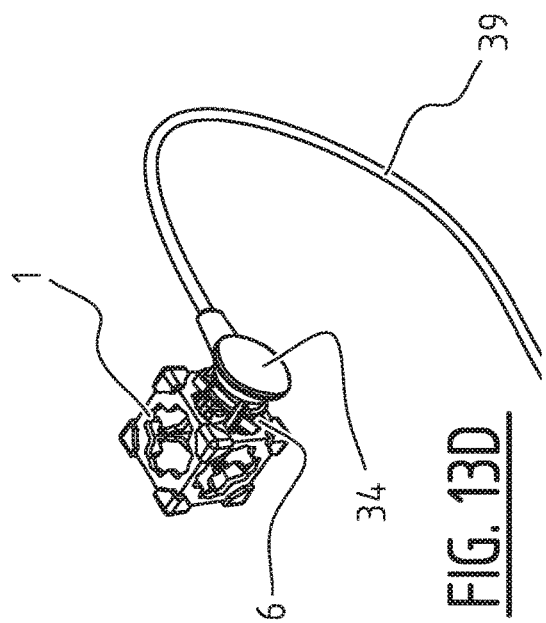

FIG. 13B shows the following stage as according to FIG. 12B.

Figure 13C:
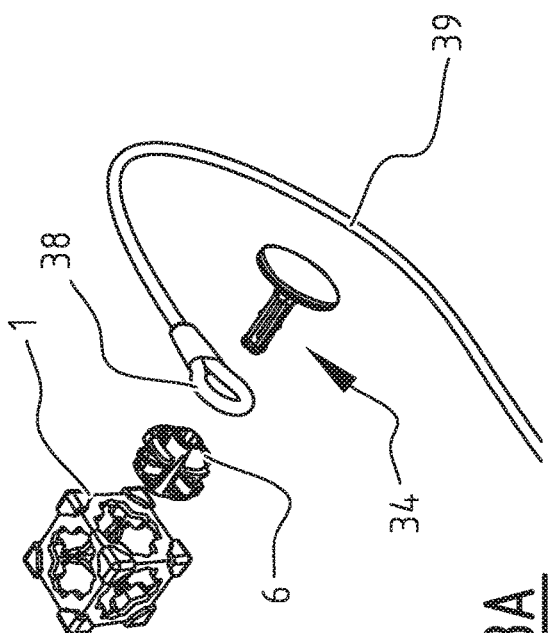

FIG. 13C shows the third stage as according to FIG. 12C.

Figure 13D:
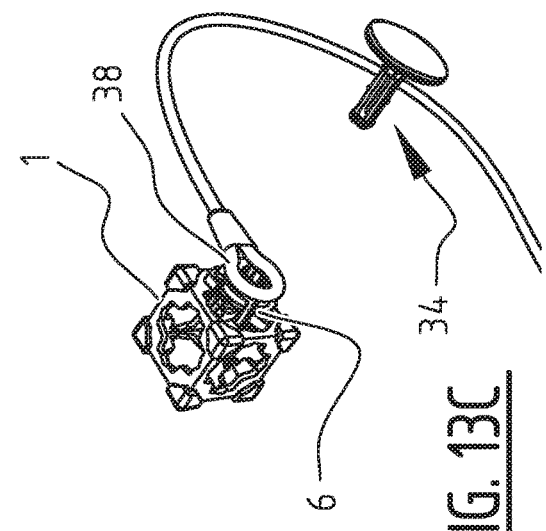

FIG. 13D finally shows the final stage, as according to FIG. 12D, in which the cord is coupled to object 1.

FIG. 14 is a side view of attaching element 34.

Shank 35 has an elongate continuous transverse hole 40 which is defined and bounded by two wall parts of the shank designated with reference numerals 41 and 42. It will be apparent that the force necessary to move the central parts of wall parts 41 and 42 some radial distance toward each other is very substantially smaller than the force necessary to have a shank without elongate continuous hole 40, so a solid shank, undergo the same deformation, even if this were possible. This aspect is important, as will be particularly apparent from the following elucidation with reference to FIG. 15.

Wall parts 41, 42 each have in the middle a rounded protrusion 43, 44 connecting smoothly to these wall parts 41, 42.

Head 36 has a relatively wide outer part 45 and a relatively narrow inner part 46.

Inner part 46 has a large diameter such that it does not fit inside the sleeve. This inner part 46 thus forms the stop of the attaching element defining the operative position shown in FIGS. 12D and 13D.

In anticipation of the discussion of FIG. 15C, it is now already pointed out that in the operative position the free end surface 47 of shank 35 lies at the same location as the corresponding end surface 48 of coupling element 6. FIG. 15C shows this aspect clearly.

FIGS. 3C and 3D, among others, show the internal shape of sleeve 37. This shape can be described as a cylinder shape with four longitudinal ribs disposed at 90° relative to each other such that sleeve 37 is prismatic, i.e. the cross-sectional form of the sleeve is the same at any axial position.

FIG. 14C shows the round shape of the wide outer part 45 of head 36.

FIG. 14D shows that shank 35 has the same shape in end view, with the proviso that the shank head 49 which determines this end view is slightly smaller than the internal shape of sleeve 37 as according to FIGS. 3C and 3D. Shank head 49 can hereby slide in the sleeve, but it is locked against rotation at each axial position.

At the end adjoining head 36 the shank has a second head 50 of the same shape which in operative position makes extra provision for an additional rotation locking.

FIG. 14E is a perspective view of attaching element 34. Attention is drawn to the fact that it will be particularly apparent from this FIG. 14E that the elongate continuous transverse hole 40 extends along the length of the shank between first shank head 49 and second shank head 50. It is also pointed out that protrusions 43 and 44 are located precisely halfway along this distance.

FIG. 15A shows a drawing, which can again be deemed an exploded view, of the situation where attaching element 34 is ready to be inserted with its shank 35 into sleeve 37 which extends through the whole coupling element 6 and has a prismatic form, i.e. has the same cross-sectional form at any position.

Situated in this embodiment in the middle of the wall 51 defining sleeve 37 are recesses embodied as through-holes 52 which in a way to be described below can co-act in locking manner with the resiliently disposed protrusions 43, 44 on wall parts 41, 42 of shank 35.

As shown in FIG. 15B, in the half-inserted position of shank 35 this shank is moved downward under the influence of an axial pressure force exerted on head 36 so that the rounded protrusions 43, 44 connecting smoothly to wall parts 41, 42 of shank 35 are pressed radially inward by the end edge 54 of sleeve 37, this being possible as a result of the flexibility of wall parts 41, 42 of shank 35. The effective diameter of shank 35 is thus limited to the space available, i.e. the respective inner diameter of sleeve 37. This provides the option of moving shank 35 further downward, while overcoming a certain friction force, to the situation as shown in FIG. 15C in which protrusions 43, 44 engage in elastically pressing manner in holes 52. Attaching element 34 and object 1, in particular sleeve 37, are relatively dimensioned such that in the operative position shown in FIG. 15C the end surface of the narrow inner part 46 of head 36 facing toward shank 35 engages on upper end edge 54 of sleeve 37. It is also reiterated that the free end surface 47 of shank 35 is situated in substantially the same plane as the end surface of coupling element 6.

It will be apparent from the foregoing that attaching element 34 can be placed in the operative position shown in FIG. 15C by exerting a certain pressure force on head 36. Attaching element 34 can be removed from this operative position by exerting a force opposed to the pressure force 53, so a pulling force, on head 36. It hereby becomes apparent that the attachment of a plate, a fabric, a cord or the like can be brought about and released again.

The thickness of the narrow inner part 46 of head 36, i.e. its axial dimension, must be sufficiently large to accommodate an element for attachment, such as grommet 33 or loop 38 of cord 39, relative to the coupling element with some freedom of movement, particularly for rotation.

FIG. 16 shows a coupling element 6 according to a third embodiment of the invention. Only the differences from the coupling element according to the second embodiment of FIGS. 11A-11C will be described, and for a further description reference is made to the description above relating to the respective FIGS. 11A-11C and 2A-2C. Coupling element 6 according to the third embodiment differs from coupling element 6 according to the second embodiment in that it is provided with a projection 61 on an inner surface of tongue 9, or on the side of tongue 9 facing toward the body 7 of coupling element 6. Projection 61 prevents the possibility of tongue 9 being moved so far inward that tongue 9 breaks off. Projection 61 therefore functions as a limiting means for limiting the inward movement of tongue 9. Another difference is that in this embodiment tongue 9 does not comprise a rib 16, but that the projection with engaging surface 11, element 13 and locking cam 10 are connected directly to tongue 9, or form part thereof.

FIG. 17A shows a tool 20 for rotating a coupling element 6 according to a second embodiment. Tool 20 comprises a central piece 64 with two opposite surfaces. A substantially straight elongate pin-like body 62 extends from the one surface of central piece 64. An elongate pin-like body 63 with an end zone 65 bent at an angle of about 90 degrees extends from the other surface. Pin-like bodies 62, 63 extend here in opposite directions. Pin-like bodies 62, 63 each have a substantially round cross-section, wherein end zones 65, 66 thereof have a non-round section, in particular with a shape adapted to continuous opening 14 of coupling element 6.

FIG. 17B shows a tool 20 for rotating a coupling element 6 according to a third embodiment of the invention. Tool 20 comprises a rod body 301 comprising two straight segments 302 separated by a bend segment 303. Straight segments 302 form two substantially pin-like bodies extending in opposite directions. Bend segment 303 surrounds a part of a flat element 304 which forms a gripping surface for a user. The one straight segment 302 has an end zone 66 disposed in line therewith. The other straight segment 302 has an end zone 65 bent at an angle of 90 degrees. End zones 65, 66 have a non-round section, in particular with a shape adapted to continuous opening 14 of coupling element 6.

FIGS. 18A and 18B show two mutually connectable objects 70 and 71, each with an opening 3 as described above. Object 70 has a cylindrical shaft 72 which can be arranged in a hollow cylinder 73 of object 71, see FIG. 18B. For arranging of shaft 72 in and removal thereof from hollow cylinder 73 the cylinder 73 has an open part 74. This open part is a part of the periphery of hollow cylinder 73 and extends over the full length of cylinder 73. In their coupled state objects 70 and 71 can swivel or pivot relative to each other about the axes of shaft 72 and cylinder 73. The maximum swivel angle can be selected as desired, and can for instance be 180 degrees. Using openings 3 the objects 70 and 71 can be connected to other objects according to the invention in the manner as elucidated above and with use of a coupling element 6. Two structures assembled with objects and coupling elements can in this way be embodied pivotally relative to each other.

FIGS. 19A-19D show other further embodiments of objects 80, 81 according to the invention. Objects 80, 81 each comprise substantially two cube-shaped parts 82 mutually connected by means of a central piece 83 fixedly connected thereto. Central piece 83 is embodied such that cube-shaped parts 82 extend at a selected fixed angle α relative to each other. In the case of object 80 the angle α is about 60 degrees, in the case of object 81 the angle α is about 120°. It will be apparent that the angle α can be selected as desired. Cube-shaped parts 82 can have any desired shape, and can in particular also be beam-shaped. It can be seen particularly in FIGS. 19B and 19D that protrusions 5 have an asymmetrical form as already elucidated above.

FIGS. 20A-20C each show a shaft 90 for use in the construction system according to the invention. Shaft 90 can for instance be a coupling shaft with which an object as described above can be coupled to another (type of) object. Shaft 90 has a cylindrical elongate body of substantially round cross-section. At both end zones shaft 90 has two longitudinal notches 91 disposed diametrically of each other, and a flange 92 extending in radial direction. Provided in the middle of shaft 90 of FIG. 20A is a radially extending central flange or collar 93 and in the middle of shaft 90 of FIGS. 20B and 20C a thickened portion 94. Thickened portion 94 is formed by a central part with a diameter larger than the diameter of the other parts of shaft 90.

Shaft 90 can particularly be a rotation shaft about which the two objects coupled thereto can rotate, in particular freely, relative to each other. When shaft 90 functions as rotation shaft, thickened portion 94 can strengthen shaft 90, which is useful when two relatively large structures assembled with the system according to the invention rotate relative to each other.

Shaft 90 can for instance be arranged in an opening 14 of a coupling element 6 arranged in an object. Because of the round cross-section of shaft 90 and/or the cross-sectional dimension thereof it can rotate freely relative to coupling element 6.

As shown in FIGS. 20A-20C, shaft 90 can be embodied in any desired length. The optional thickened portion 94 can likewise be embodied in any desired length.

FIGS. 21A and 21B show a substantially plate-like element 100 which takes a smooth form on one main surface 103 and has connecting means 102 on its other main surface 101 for connection to an object with openings 3 as described above. Connecting means 102 are formed by snap elements 104 with which plate 100 can be snapped fixedly into openings 3 of an object. Plate 100 can be removed again from the object with little force by pulling snap elements 104 out of openings 3. The smooth main surface 103 forms a low-friction sliding surface for two structures assembled with the system according to the invention which rotate relative to each other.

FIG. 22 shows a shaft 110 according to another embodiment of substantially square cross-section and with a longitudinal rib disposed close to each corner of the square cross-section and each extending over the full length of shaft 110.

Shaft 110 can optionally be inserted into an opening 14 of a coupling element 6 and engage thereon so that shaft 110 and coupling element 6 cannot rotate relative to each other. The cross-section of shaft 110 can be substantially adapted here to the cross-sectional form of opening 14.

FIGS. 23A and 23B show that object 1 can be manufactured from two identical halves 120, for instance by injection moulding, which halves 120 are permanently connected to each other in order to provide the object 1, which in this example is cube-shaped. FIG. 23A shows the two halves before they are connected and FIG. 23B shows the halves connected to form object 1. The halves 120, in particular ribs of the cube, have mutually co-acting connecting means in the form of a protruding dowel 121 and hole 122. Dowels 121 of the one ribs of cube 1 are arranged in holes 122 of the other ribs of cube 1. The permanent connection is preferably provided by ultrasonic welding of the dowels 121 arranged in holes 122.

FIG. 24 shows in more detail a skin plate 19 with openings 3 punched therein.

FIG. 25 shows an object 130 according to yet another embodiment of the invention. Object 130 is similar to object 1 according to the first embodiment, whereby only the differences between them will be described, and for a further description of object 130 reference is made to the description of object 1 according to the first embodiment. Object 130 has thickened portions in the form of ribs 131 close to the transition zones between two adjacent surfaces 2. Ribs 131 serve for strengthening purposes.

FIG. 26 shows a slide plate 140. Just as the slide plate of FIGS. 21A and 21B, slide plate 140 according to this second embodiment of the invention comprises a substantially plate-like element which takes a smooth form on one main surface 141 and has connecting means 143 on its other main surface 142 for connection to an object with openings 3 as described above. Connecting means 143 show some resemblance to the connecting means of the coupling element according to the invention. Slide plate 140 can be arranged in an arranging orientation in an opening 3 of an object and subsequently rotated to a locking orientation. In the locking orientation a locking cam 144 of slide plate 140 engages on a lip 4 of the object so that in the locking orientation the slide plate is locked in an axial translational direction. Rotation of the slide plate between the arranging orientation and locking orientation can for instance take place by arranging a tool as described above in the continuous opening 145 of slide plate 140. The smooth main surface 141 forms a low-friction sliding surface for two structures assembled with the system according to the invention which rotate relative to each other.

FIG. 27 shows a coupling element 6 according to a fourth embodiment of the invention. Only the differences from coupling element 6 according to the third embodiment of FIG. 16 will be described here. For a further description reference is made to the figure description for FIG. 16, FIGS. 11A-11C and 2A-2C respectively. Coupling element 6 according to the fourth embodiment has ribs 150 which extend between tongues 9 and pin-like body 7, and ribs 151 on an outer surface of locking cams 10. Ribs 150, 151 are provided in order to prevent coupling element 6 being pressed into an opening 3 of an object in an orientation other than the arranging orientation, at least not during normal use with the exertion of manual force.

FIG. 28A shows a packaging 160 in which a construction system according to the invention can be stored. Packaging 160 can for instance be a cardboard packaging or the like. An upper side 161 of the packaging is provided with the number of connecting means in the form of plate-like objects 162. According to the invention objects 162 comprise surface 2, opening 3, lips 4 and protrusions 5, see FIG. 28B in which the object 162 is shown in detail. Objects 162 can for instance be adhered to packaging 160 or be connected thereto in any other random manner. A recess can be arranged, in particular punched, in the packaging, which recess is arranged in register with opening 3 in object 162 so that a coupling element 6 according to the invention can be arranged via opening 3 of object 162 in the recess in the packaging. Object 162 can alternatively be given a thicker form so that the coupling element does not protrude from object 162. Using objects 162 and coupling elements 6 a first packaging 160 can be connected to a following packaging 160, for instance in a stacked form, see FIG. 28C. Both the upper side and the underside of packaging 160 comprise a number of objects 162 here, wherein the underside of a packaging 160 can be connected to the upper side of a packaging 160 disposed thereunder by arranging coupling elements 6 in the objects 162 arranged in register with each other and subsequently rotating coupling elements 6 to the locking orientation.

FIG. 29A shows a wheel element 200 with profile ribs 201. Wheel element 200 comprises a receiving space 202 for receiving at least a part of an object 1 of the construction system. In this embodiment receiving space 202 is a through-opening extending in an axial direction of wheel element 200 between two axial sides 204. Wheel element 200 is provided with one or more snap fingers 203 configured to engage on an object 1 arranged therein, for instance on at least one lip 4 of the number of lips 4 and/or on at least one protrusion 5 of the number of protrusions 5 thereof. Snap fingers 203 are connected in this example to an inner wall of wheel element 200, which inner wall defines receiving space 202. Wheel element 200 can be embodied symmetrically, wherein object 1 can be arranged in and/or removed from receiving space 202 on either side of wheel element 200.

FIGS. 29B and 29C show wheel element 200 with an object 1 that is being arranged therein, wherein a coupling element 6 is arranged in object 1 in the above described manner and wherein a shaft 90 is arranged in opening 14 of coupling element 6. FIG. 29B shows an exploded view here and FIG. 29C shows the assembled situation. The free end of shaft 90 can be arranged in another coupling element 6 which can be arranged in another object 1, so that wheel element 200 can be connected to another object 1 and can rotate relative to this other object 1.

FIG. 30A shows two objects 1 according to yet another embodiment of the invention which are coupled to a coupling element 6 according to a fifth embodiment of the invention. Object 1 differs from the object according to the previous embodiment of FIGS. 1A and 1B in that disposed in each case over a peripheral edge of openings 3 are eight lips 4, between which a total of four protrusions 5 are arranged. For a further description of object 1 reference is made to the description of the first embodiment of the object, particularly associated with FIGS. 1A and 1B.

FIG. 30B shows the two objects 1 and coupling element 6 of FIG. 30A in an uncoupled state. Coupling element 6 substantially resembles the coupling element of FIGS. 11A-11C. Only the differences are described below. For a further description reference is made to the description for FIGS. 11A-11C and 2A-2C respectively. In this embodiment coupling element 6 comprises two engaging surfaces 11 formed by projections which are disposed in a V-shape relative to each other and which form part of tongue 9. The V-shape results in a groove between the two engaging surfaces 11. Following insertion of pin-like body 7 into opening 3 of object 1 a first of the two engaging surfaces 11 can be moved beyond a protrusion 5 of object 1 by displacing tongue 9 inward. Protrusion 5 then drops into the groove between the two engaging surfaces 11 in the locking orientation of coupling element 6. From the locking orientation coupling element 6 can be rotated in two rotational directions about its axis to the arranging orientation. Coupling element 6 and object 1 according to this embodiment do not therefore comprise any rotation limiting means.

FIG. 31 shows the same objects 1 as in FIGS. 30A, 30B with a coupling element 6 according to a sixth embodiment of the invention. Coupling element 6 differs from the coupling element of FIG. 30B in that engaging surface 11 comprises a groove-like recess 11' in which a protrusion 5 of object 1 can be received in the locking orientation. Coupling element 6 according to the sixth embodiment is further embodied in simple manner wherein several components, such as among others ribs 150 and 151, projection 61 and opening 60 are omitted. This demonstrates that the above described features of coupling element 6 are optional and can be applied as desired, optionally in any desired combination.

The components of the construction system, in particular the objects, the coupling elements, the wheel elements and the attaching elements, are preferably manufactured from plastic. A suitable, mechanically strong plastic is for instance ABS.

It is noted that the invention is not limited to the above discussed exemplary embodiments but also extends to other variants within the scope of the appended claims.

The invention claimed is:

1. A coupling element comprising a body with an axial axis arrangeable in an opening of an object, the body having two axial ends, wherein the body is provided along an outer periphery thereof with at least one outward extending locking cam, wherein the body is provided with a resiliently movable tongue extending therefrom, wherein the locking cam is connected to said tongue, wherein said tongue is movable inward by a force being exerted thereon,
   wherein said tongue comprises an engaging surface,
   wherein each axial end of said body is positioned at a distance relative to said engaging surface of said tongue as seen in an axial direction, wherein said tongue is connected to one axial end of the two axial ends of the body, wherein the one axial end is the axial end positioned at a greatest distance relative to the engaging surface as seen in the axial direction.

2. The coupling element as claimed in claim 1, wherein the coupling element comprises at least one rotation limiting element co-acting with the object.

3. The coupling element as claimed in claim 1, wherein the coupling element comprises at least one engaging element, for engagement by a tool for rotating the coupling element.

4. The coupling element as claimed in claim 3, wherein the engaging element of the coupling element comprises an engaging opening for receiving an engaging part of a tool.

5. The coupling element as claimed in claim 4, wherein the engaging opening has a shape adapted to the engaging part of the tool, so that the engaging part of the tool can engage in the engaging opening of the coupling element for rotating the coupling element.

6. The coupling element as claimed in claim 5, wherein: the engaging opening of the coupling element is a continuous opening and wherein the engaging opening of the coupling element is bounded by a sleeve which forms part of the coupling element and which sleeve comprises inwardly oriented longitudinal thickened portions, wherein mutually adjacent longitudinal thickened portions bound respective longitudinal recesses.

7. The coupling element as claimed in claim 5, wherein: the engaging opening of the coupling element is a continuous opening and wherein the engaging opening of the coupling element is bounded by a sleeve which forms part of the coupling element and which sleeve comprises inwardly oriented longitudinal thickened portions, wherein mutually adjacent longitudinal thickened portions bound respective longitudinal recesses.

8. The coupling element as claimed in claim 7, further comprising a stop for limiting inward movement of the tongue, the stop arranged on the tongue on a side thereof facing toward the body of the coupling element or arranged on the outer periphery of the body of the coupling element in an area which is in register with the tongue.

9. The coupling element as claimed in claim 8, wherein the coupling element is provided with at least one insertion limiting element co-acting with the object.

10. The coupling element as claimed in claim 1, wherein the coupling element comprises at least two tongues which extend from different axial ends of the two axial ends of the body in an opposite axial direction in order to provide a coupling between two objects.

11. The coupling element as claimed in claim 10, wherein the coupling element is flexibly bendable between the two axial ends of the body.

12. The coupling element as claimed in claim 11, wherein the engaging element of the coupling element comprises an engaging opening for receiving an engaging part of a tool.

13. The coupling element as claimed in claim 1, further comprising a stop for limiting inward movement of the tongue, the stop arranged on the tongue on a side thereof facing toward the body of the coupling element or arranged on the outer periphery of the body of the coupling element in an area which is in register with the tongue.

14. The coupling element as claimed in claim 1, wherein the coupling element is provided with at least one insertion limiting element co-acting with the object.

15. The coupling element as claimed in claim 1, wherein the coupling element comprises at least one rotation limiting element co-acting with the object.

16. The coupling element as claimed in claim 15, wherein the coupling element comprises at least one engaging element, for engagement by a tool for rotating the coupling element.

17. The coupling element as claimed in claim 16, wherein the coupling element comprises at least two tongues which extend from different axial end of the two axial ends of the body in an opposite axial direction in order to provide a coupling between two objects.

* * * * *